US012647050B2

(12) United States Patent
Orii et al.

(10) Patent No.: US 12,647,050 B2
(45) Date of Patent: Jun. 2, 2026

(54) POWER CONVERSION DEVICE FOR CONVERTING POWER FROM A DIRECT-CURRENT (DC) POWER SOURCE TO AN ALTERNATING CURRENT (AC) ROTATING MACHINE

(71) Applicant: Mitsubishi Electric Corporation, Tokyo (JP)

(72) Inventors: Masahiko Orii, Tokyo (JP); Tatsuya Mori, Tokyo (JP); Kenta Kubo, Tokyo (JP); Kento Ogiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 275 days.

(21) Appl. No.: 18/039,081

(22) PCT Filed: Dec. 15, 2020

(86) PCT No.: PCT/JP2020/046656
§ 371 (c)(1),
(2) Date: May 26, 2023

(87) PCT Pub. No.: WO2022/130480
PCT Pub. Date: Jun. 23, 2022

(65) Prior Publication Data
US 2024/0007021 A1     Jan. 4, 2024

(51) Int. Cl.
H02M 7/539     (2006.01)
H02M 1/00     (2006.01)
(Continued)

(52) U.S. Cl.
CPC ....... H02M 7/5395 (2013.01); H02M 1/0025 (2021.05); H02M 1/0048 (2021.05);
(Continued)

(58) Field of Classification Search
CPC ............. H02M 7/5395; H02M 1/0025; H02M 1/0048; H02M 1/14; H02M 7/53871; H02M 1/0009; H02M 1/327; H02P 27/08
See application file for complete search history.

(56) References Cited

U.S. PATENT DOCUMENTS

| | | | | |
|---|---|---|---|---|
| 5,699,240 A | * | 12/1997 | Obayashi .......... | H02M 7/53875 318/811 |
| 8,917,050 B2 | * | 12/2014 | Kimpara ................. | H02P 21/50 318/400.26 |

(Continued)

FOREIGN PATENT DOCUMENTS

| | | |
|---|---|---|
| EP | 3 439 163 A1 | 2/2019 |
| JP | 5161985 B2 | 3/2013 |
| JP | 6525364 B2 | 6/2019 |

OTHER PUBLICATIONS

Extended European Search Report issued Jan. 3, 2024 in European Application No. 20965868.1.

(Continued)

*Primary Examiner* — Yusef A Ahmed
(74) *Attorney, Agent, or Firm* — Sughrue Mion, PLLC

(57) ABSTRACT

A modulation control unit calculates a voltage offset on the basis of fundamental or basic voltage references, and calculates modification voltage references by performing superposition of the voltage offset on the basic voltage references; and an inverter converts, on the basis of the modification voltage references calculated by the modulation control unit, a DC voltage into three-phase voltages whose voltages are applied to three-phase windings of an alternating current rotating machine, wherein, in a case in which the basic voltage references are transformed into three-phase voltage references, and when the three-phase voltage references are defined as a maximum phase, an intermediate phase and a minimum phase in decreasing
(Continued)

order of value, the modulation control unit calculates a first voltage offset on the basis of the DC voltage, on that of the maximum phase, and on that of sum of squares of the basic voltage references.

1 Claim, 17 Drawing Sheets

(51) Int. Cl.
H02M 1/14 (2006.01)
H02M 7/5387 (2007.01)
H02M 7/5395 (2006.01)
H02P 27/08 (2006.01)
H02M 1/32 (2007.01)

(52) U.S. Cl.
CPC ......... H02M 1/14 (2013.01); H02M 7/53871 (2013.01); H02P 27/08 (2013.01); H02M 1/0009 (2021.05); H02M 1/327 (2021.05)

(56) References Cited

U.S. PATENT DOCUMENTS

| 12,283,899 | B2* | 4/2025 | Hiwatari | H02M 1/0058 |
|---|---|---|---|---|
| 2002/0131285 | A1* | 9/2002 | Kawakami | H02M 7/53875 |
| | | | | 363/132 |
| 2006/0215429 | A1* | 9/2006 | Oka | H02P 21/22 |
| | | | | 363/97 |
| 2008/0061728 | A1* | 3/2008 | Tomigashi | H02M 7/217 |
| | | | | 318/801 |
| 2010/0060211 | A1* | 3/2010 | Hashimoto | H02P 21/22 |
| | | | | 318/400.02 |
| 2012/0206075 | A1* | 8/2012 | Kimpara | H02P 21/50 |
| | | | | 318/400.15 |
| 2015/0236609 | A1* | 8/2015 | Kato | H02M 7/06 |
| | | | | 363/78 |
| 2016/0308465 | A1* | 10/2016 | Yoo | H02M 7/5395 |
| 2017/0294863 | A1* | 10/2017 | Takahashi | H02P 21/20 |
| 2018/0006547 | A1* | 1/2018 | Mori | H02M 1/088 |
| 2018/0022378 | A1* | 1/2018 | Furukawa | H02P 27/08 |
| | | | | 324/76.77 |
| 2018/0219506 | A1* | 8/2018 | Mori | B62D 5/046 |
| 2018/0269771 | A1* | 9/2018 | Mori | H02M 7/53873 |
| 2019/0058418 | A1* | 2/2019 | Mori | G01R 31/40 |
| 2019/0097559 | A1* | 3/2019 | Li | H02M 7/53871 |
| 2019/0131887 | A1* | 5/2019 | Mori | H02M 1/08 |
| 2020/0144883 | A1* | 5/2020 | Aoki | H02P 25/22 |
| 2020/0153375 | A1* | 5/2020 | Mori | H02M 7/53871 |
| 2020/0373869 | A1* | 11/2020 | Mori | H02M 7/53871 |
| 2021/0114652 | A1* | 4/2021 | Mori | H02P 29/50 |
| 2022/0052625 | A1* | 2/2022 | Momochi | H02M 7/53871 |
| 2022/0103102 | A1* | 3/2022 | Kezobo | H02P 21/20 |
| 2022/0166356 | A1* | 5/2022 | Kitagawa | H02P 21/18 |
| 2022/0224266 | A1* | 7/2022 | Mori | B62D 5/0463 |
| 2023/0001979 | A1* | 1/2023 | Mori | H02M 7/5395 |
| 2023/0141601 | A1* | 5/2023 | Hara | B60L 15/007 |
| 2023/0223824 | A1* | 7/2023 | Hara | H02M 1/327 |
| | | | | 310/68 R |
| 2023/0249742 | A1* | 8/2023 | Mori | B62D 5/046 |
| | | | | 180/443 |
| 2023/0268859 | A1* | 8/2023 | Mori | B62D 5/046 |
| | | | | 318/400.02 |
| 2023/0318488 | A1* | 10/2023 | Mori | H02P 21/05 |
| | | | | 363/41 |
| 2023/0412100 | A1* | 12/2023 | Kitagawa | H02P 21/22 |
| 2024/0025472 | A1* | 1/2024 | Mori | B62D 5/0463 |
| 2024/0380337 | A1* | 11/2024 | Hara | H02M 7/5395 |

OTHER PUBLICATIONS

International Search Report for PCT/JP2020/046656 dated Mar. 16, 2021 [PCT/ISA/210].

* cited by examiner start $Vmax=max(Vub、Vvb、Vwb)$ — S101

$Vpeak=\sqrt{(2(Vub^2+Vvb^2+Vwb^2))}$ — S102

$Voffset1=Vmax-Vpeak-0.5Vdc$ — S103

$Vu=Vub-Voffset1$
$Vv=Vvb-Voffset1$
$Vw=Vwb-Voffset1$ — S104 end

FIG. 6

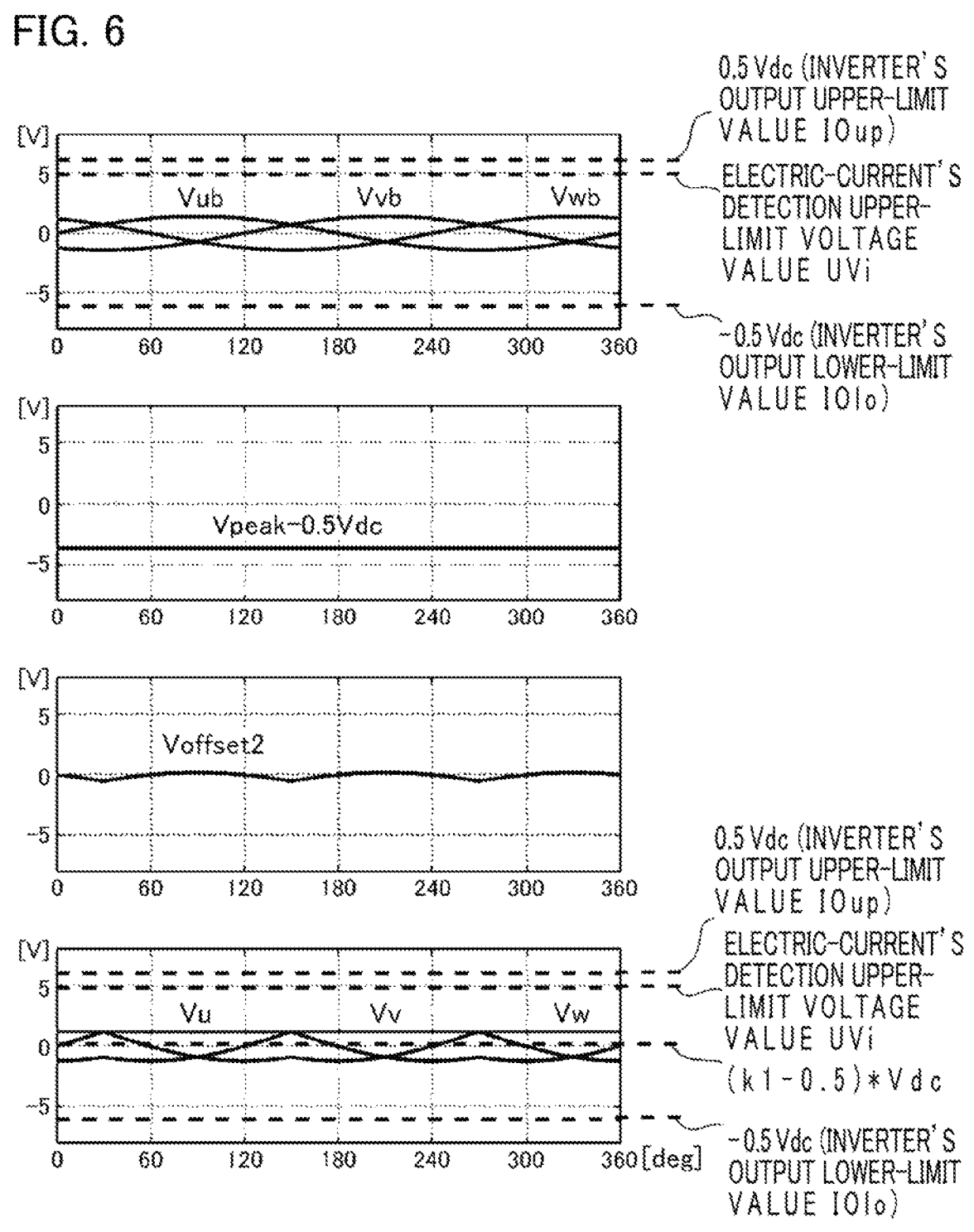

0.5Vdc (INVERTER'S
OUTPUT UPPER-LIMIT
VALUE IOup)

ELECTRIC-CURRENT'S
DETECTION UPPER-
LIMIT VOLTAGE
VALUE UVi

-0.5Vdc (INVERTER'S
OUTPUT LOWER-LIMIT
VALUE IOlo)

Vub    Vvb    Vwb

Vpeak-0.5Vdc

Voffset2

0.5Vdc (INVERTER'S
OUTPUT UPPER-LIMIT
VALUE IOup)

ELECTRIC-CURRENT'S
DETECTION UPPER-
LIMIT VOLTAGE
VALUE UVi $(k1-0.5)*Vdc$

Vu    Vv    Vw

-0.5Vdc (INVERTER'S
OUTPUT LOWER-LIMIT
VALUE IOlo)

FIG. 16

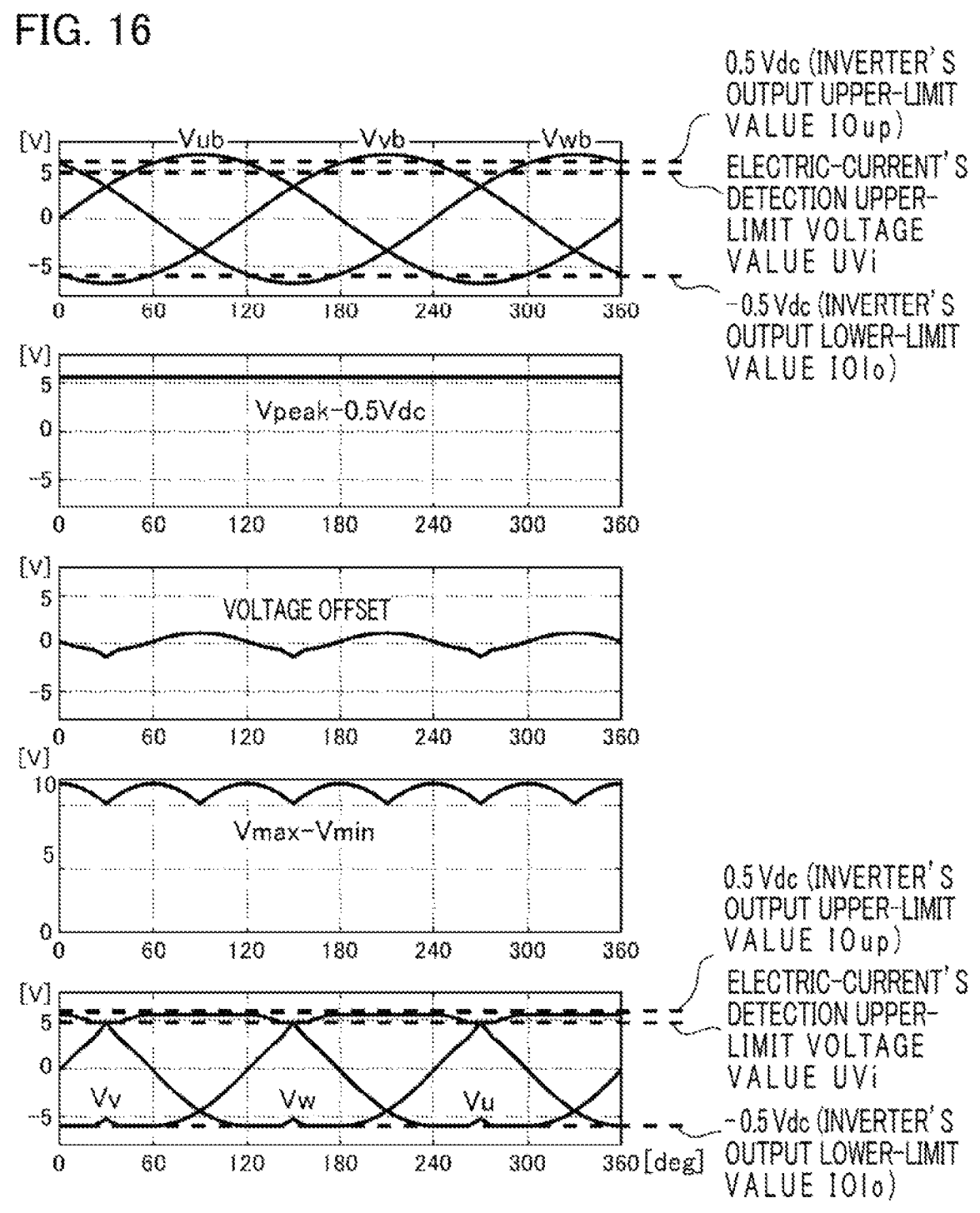

0.5 Vdc (INVERTER'S OUTPUT UPPER-LIMIT VALUE IOup)

ELECTRIC-CURRENT'S DETECTION UPPER-LIMIT VOLTAGE VALUE UVi

−0.5 Vdc (INVERTER'S OUTPUT LOWER-LIMIT VALUE IOlo)

Vub    Vvb    Vwb

Vpeak−0.5Vdc

VOLTAGE OFFSET

Vmax−Vmin 0.5 Vdc (INVERTER'S OUTPUT UPPER-LIMIT VALUE IOup)

ELECTRIC-CURRENT'S DETECTION UPPER-LIMIT VOLTAGE VALUE UVi

−0.5 Vdc (INVERTER'S OUTPUT LOWER-LIMIT VALUE IOlo)

Vv    Vw    Vu

POWER CONVERSION DEVICE FOR CONVERTING POWER FROM A DIRECT-CURRENT (DC) POWER SOURCE TO AN ALTERNATING CURRENT (AC) ROTATING MACHINE

CROSS REFERENCE TO RELATED APPLICATIONS

This application is a National Stage of Application No. PCT/JP2020/046656 filed Dec. 15, 2020.

TECHNICAL FIELD

The disclosure of the present application relates to an electrical power conversion device which converts, on the basis of three-phase voltage references, a direct current (DC) voltage into three-phase voltages, and outputs them.

BACKGROUND ART

Conventionally, in order to enhance a voltage utilization factor of a PWM inverter, a technology for modulating a voltage(s) is widely known. Moreover, in addition to the enhancement of the voltage utilization factor, modulation methods have been proposed in accordance with various purposes. For example, in Patent Document 1, when three-phase voltage references are defined as a maximum phase, an intermediate phase and a minimum phase in decreasing order of value, the modulation to keep the maximum phase at a constant and the modulation to keep the minimum phase at a constant are changed over in accordance with the difference between the maximum phase and the minimum phase.

Hereinafter, the modulation to keep a maximum phase at a constant is referred to as an "upper-level held modulation," and the modulation to keep a minimum phase is referred to as a "lower-level held modulation." The upper-level held modulation is performed for the purpose of reducing losses due to voltage reduction of electric-current detecting elements mounted on lower arms, and the lower-level held modulation is performed for the purpose of maximizing an electric-current's detection allowance time. According to the upper-level held modulation, the modulation is performed so that a maximum phase take on a voltage value determined in advance; and in addition, according to the lower-level held modulation, the modulation is similarly performed so as to take also on a voltage value determined in advance.

In Patent Document 2, it is so arranged that intervals to take on a two-phase modulation are reduced, and that modulation methods are changed over in accordance with voltage amplitudes so that output voltages do not exceed an output allowance range of an inverter.

RELATED ART DOCUMENTS

Patent Documents

[Patent Document 1] Japanese Patent Publication No. 5161985
[Patent Document 2] Japanese Patent Publication No. 6525364

SUMMARY OF THE INVENTION

Problems to be Solved by the Invention

When the magnitudes of three-phase voltage references are large, maximum phase peaks also become larger, so that duties also become larger. When there are three-phase electric-current detecting resistance elements in each lower arm of an inverter, and when the duties are larger, the time to energize the electric-current detecting resistance elements of the lower arms becomes shorter, and so, electric current detecting accuracy degrades.

In order to secure a lower-arm's conduction time for the purpose of electric current detection in the most effective manner possible, peaks of the maximum phase after the modulation appear at six times in one period of electrical angle when a lower-level held modulation is performed, and so, the timings at each of which electric current detecting accuracy is degraded result in being caused at six time during the one period. When an electric motor control using an inverter is carried out, it is known that, due to the inherent structure, the electric motor is easy to cause induced-voltage pulsation in a six-times frequency in one period of electrical angle, so that a problem or issue of vibration and/or audible noise is caused due to a torque ripple in the frequency. When an electric current control is carried out in a state in which electric current detection is degraded at six times per the one period, there arise a problem or issue in which a torque ripple in the six-times frequency in the one period of electrical angle is further degraded.

In Patent Document 1, a lower-level held modulation is selected at the instant when the difference between a maximum phase and a minimum phase is large; however, because the duty is large at the instant when the difference between the maximum phase and the minimum phase is large, so that an issue describe above is caused. In addition, a method of modulating an average value between the maximum phase and the minimum phase as a superimposed voltage is also proposed when the difference between the maximum phase and the minimum phase exceeds the magnitude of a power source voltage; however, even when the modulation method is used, peaks of the maximum phase appears at six times in one period of electrical angle, so that an issue describe above is caused.

In Patent Document 2, an embodiment is stated in which an upper-level held modulation is selected when the magnitudes of three-phase voltage references are small, whereas, when they are large, a lower-level held modulation is selected; however, according to the method, the duty is large when the magnitudes of the three-phase voltage references are large, so that an issue describe above is caused similarly to that of Patent Document 1. In addition, an example is also described in another modification example in which an upper-level held modulation is only performed. However, as for the upper-level held modulation as exactly described above, the modulation is performed so that a maximum phase becomes constant at a voltage value(s) determined in advance, and thus, when the modulation is performed in a case in which voltage references exceed the value(s) determined in advance, the voltage references exceed an output lower-limit, so that a line-to-line voltage(s) is distorted, which newly leads to cause vibration and/or audible noise due to the distortion.

In addition, when a value determined in advance is defined as an output limit, the modulation is performed so that a maximum phase always become at the output upper-limit even at the instant when voltage references are small, so that a voltage value of a minimum phase inevitably becomes also large; and so, electric current detection becomes difficult in all three phases at the instant, which poses the disturbance on the control. In addition, a method is also disclosed in which, when the magnitudes of the voltage references are small, an upper-level held modulation is performed so that a maximum phase is set at a value capable of detecting an electric current, whereas, when the magnitudes of the voltage references are large, the upper-level held modulation is performed so that the maximum phase becomes at an output upper-level; however, according to the method, the maximum phase becomes discontinuous at the time of changeover, and so, there is a possibility of causing other vibration and audible noise originated as a cause in the discontinuity.

The present disclosure in the application concerned has been directed at solving those problems or issues as described above, an object of the disclosure is to obtain an electrical power conversion device in which, by calculating a voltage offset(s) using sum of squares of basic voltage references, electric current detecting accuracy does not degrade, and also, by using sum of squares of the basic voltage references, it becomes possible to achieve to keep a maximum phase at constant not by voltage values determined in advance, but by voltage values in accordance with the basic voltage references, so that an inverter's output lower-limit is not fallen below.

Means for Solving the Problems

An electrical power conversion device disclosed in the disclosure of the application concerned comprises: a basic voltage reference unit for outputting basic voltage references; a modulation control unit for calculating a voltage offset on the basis of the basic voltage references, and for calculating modification voltage references by performing superposition of the voltage offset on the basic voltage references; and an inverter which converts, on the basis of the modification voltage references calculated by the modulation control unit, a direct-current voltage into three-phase voltages whose voltages are applied to three-phase windings of an alternating current rotating machine, and which includes an electric current detection unit for detecting an electric current flowing through each phase of the three-phase windings in accordance with voltage reduction by an electric-current detecting resistance element connected in series with a switching element each other, wherein, in a case in which the basic voltage references are transformed into three-phase voltage references, and when the three-phase voltage references are defined as a maximum phase, an intermediate phase and a minimum phase in decreasing order of value, the modulation control unit calculates a first voltage offset on the basis of the direct-current voltage, on that of the maximum phase, and on that of sum of squares of the basic voltage references.

Effects of the Invention

According to the electrical power conversion device disclosed in the disclosure of the application concerned, a voltage offset is calculated by using sum of squares of basic voltage references, whereby electric current detecting accuracy does not degrade.

In addition, sum of squares of the basic voltage references is used, whereby it becomes possible to achieve to keep a maximum phase at constant not by voltage values determined in advance, but by voltage values in accordance with the basic voltage references, and thus, an inverter's output lower-limit is not fallen below.

BRIEF DESCRIPTION OF DRAWINGS

FIG. 6 is a diagram showing output waveforms of the power conversion device according to Embodiment 2;

FIG. 16 is a diagram showing output waveforms of the power conversion device according to Embodiment 7;

EMBODIMENTS FOR CARRYING OUT THE INVENTION

Embodiment 1

Figures 1, 2:
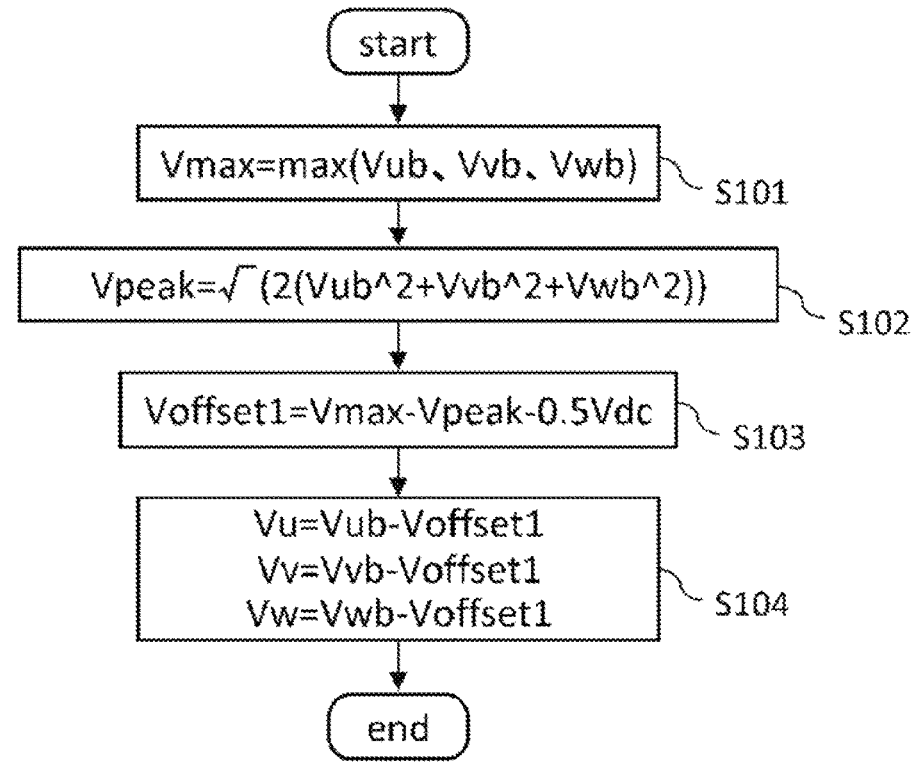
FIG. 1 is an overall diagram illustrating a configuration of an electrical power conversion device according to Embodiment 1.
FIG. 2 is a flowchart showing calculation processing of a modulation control unit in the power conversion device according to Embodiment 1.

FIG. 1 is an overall diagram illustrating a configuration of an electrical power conversion device according to Embodiment 1. In FIG. 1, an alternating current (AC) rotating machine 1 is an AC rotating machine including three-phase windings U, V and W, which is made of, for example, a permanent magnet synchronous rotating machine, a field winding type synchronous rotating machine, an induction rotating machine, a synchronous reluctance-type motor, and so forth.

A direct current (DC) power source 2 applies a DC voltage Vdc across an inverter 3. The inverter 3 performs a PWM modulation at a carrier period Tc on the basis of three-phase modification voltage instructions or references Vu, Vv and Vw, and on that of the DC voltage Vdc, and applies voltages to the three-phase windings U, V and W of the AC rotating machine. As for switches (switching elements) Sup, Svp, Swp, Sun, Svn and Swn, switches are used in which semiconductor switching elements such as IGBTs, bipolar transistors, MOS power transistors and the like are connected in antiparallel with diodes each other.

Electric-current detecting resistance elements Ru, Rv and Rw are connected in series with the lower-arm elements (switching elements) Sun, Svn and Swn of the inverter 3 each other. As for the electric-current detecting resistance element Ru, an electric current flowing through the phase-U winding of the AC rotating machine 1 is detected by acquiring a voltage across both terminals of the electric-current detecting resistance element at timing when the lower-arm element Sun turns on. As for the electric-current detecting resistance element Rv, an electric current flowing through the phase-V winding of the AC rotating machine 1 is detected by acquiring a voltage across both terminals of the electric-current detecting resistance element at timing when the lower-arm element Svn turns on. As for the electric-current detecting resistance element Rw, an electric current flowing through the phase-W winding of the AC rotating machine 1 is detected by acquiring a voltage across both terminals of the electric-current detecting resistance element at timing when the lower-arm element Swn turns on. A smoothing capacitor 4 is a capacitor for stabilizing the DC voltage Vdc of the DC power source 2. In addition, a fundamental or basic voltage reference unit 5 gives instructions of three-phase fundamental or basic voltage references Vub, Vvb and Vwb in use for driving the AC rotating machine 1.

A modulation control unit 6 calculates a first voltage offset Voffset1 on the basis of the three-phase basic voltage references Vub, Vvb and Vwb, and performs superposition of the first voltage offset on the three-phase basic voltage references Vub, Vvb and Vwb.

FIG. 2 is a flowchart showing calculation processing of the modulation control unit 6. At Step S101 in FIG. 2, a maximum phase voltage Vmax is calculated when three-phase basic voltage references among the three-phase basic voltage references Vub, Vvb and Vwb are defined as a maximum phase, an intermediate phase and a minimum phase in decreasing order of value. At Step S102, the positive square root of a value in which sum of squares of the three-phase basic voltage references Vub, Vvb and Vwb is multiplied by "2" is calculated, so that a peak voltage Vpeak is calculated. At Step S103, the peak voltage Vpeak calculated at Step S102 is subtracted from the maximum phase voltage Vmax calculated at Step S101, and, further from the value, a value in which a DC voltage Vdc is multiplied by "0.5" is calculated is subtracted, so that a first voltage offset Voffset1 is calculated. At Step S104, the first voltage offset Voffset1 is individually subtracted from the three-phase basic voltage references Vub, Vvb and Vwb, so that three-phase modification voltage references Vu, Vv and Vw are calculated, respectively. The peak voltage Vpeak is given by Expression (1), and the first voltage offset Voffset1 is given by Expression (2).

[Expression Figure-1]

$$V_{peak} = \sqrt{2\left(v_{ub}^2 + v_{vb}^2 + v_{wb}^2\right)} \qquad (1)$$

-continued

[Expression Formula-2]

$$V_{offset1} = V_{max} - V_{peak} - 0.5V_{dc} \qquad (2)$$

Figure 3:
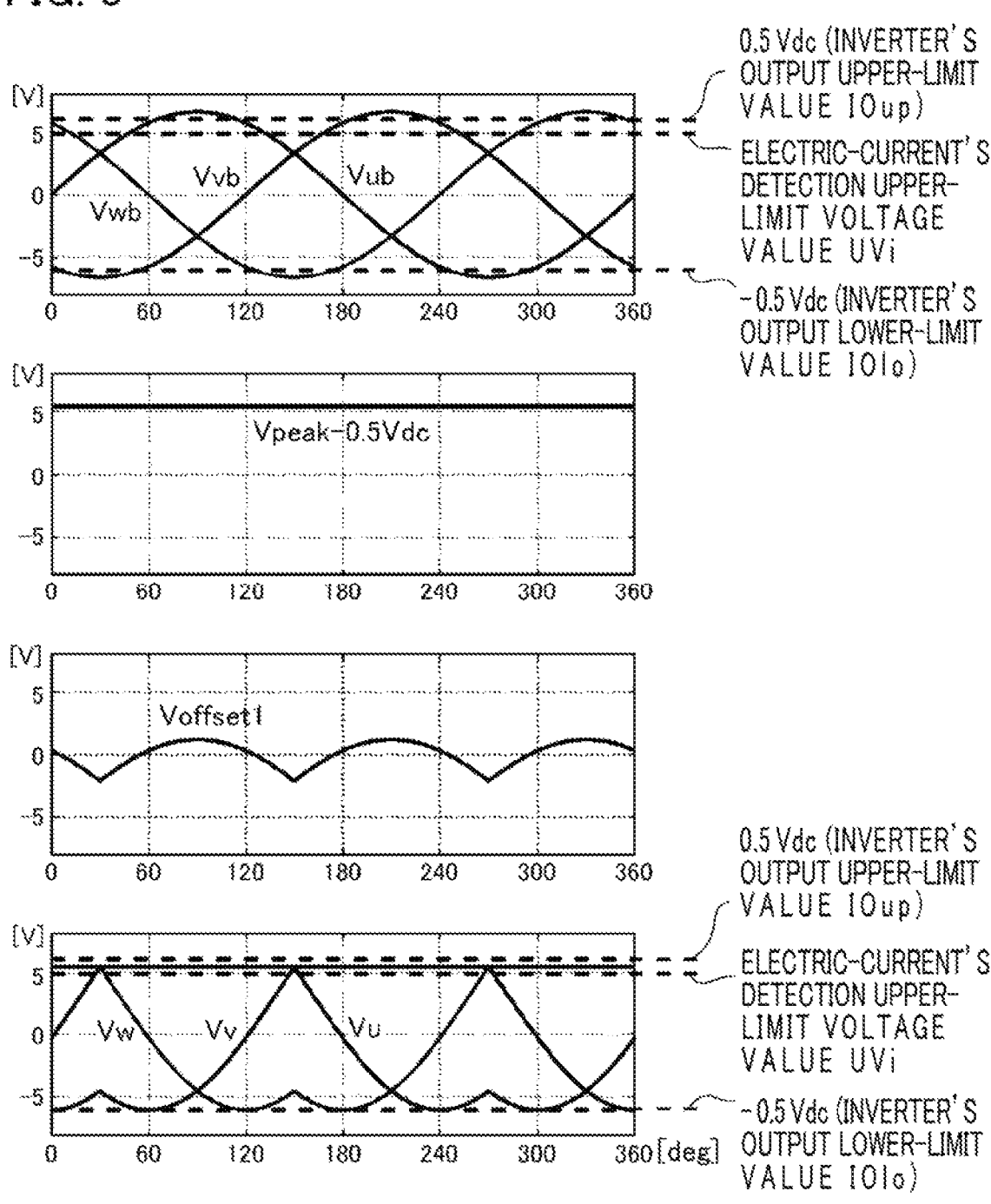
FIG. 3 is a diagram showing output waveforms of the power conversion device according to Embodiment 1.
Figure 4:
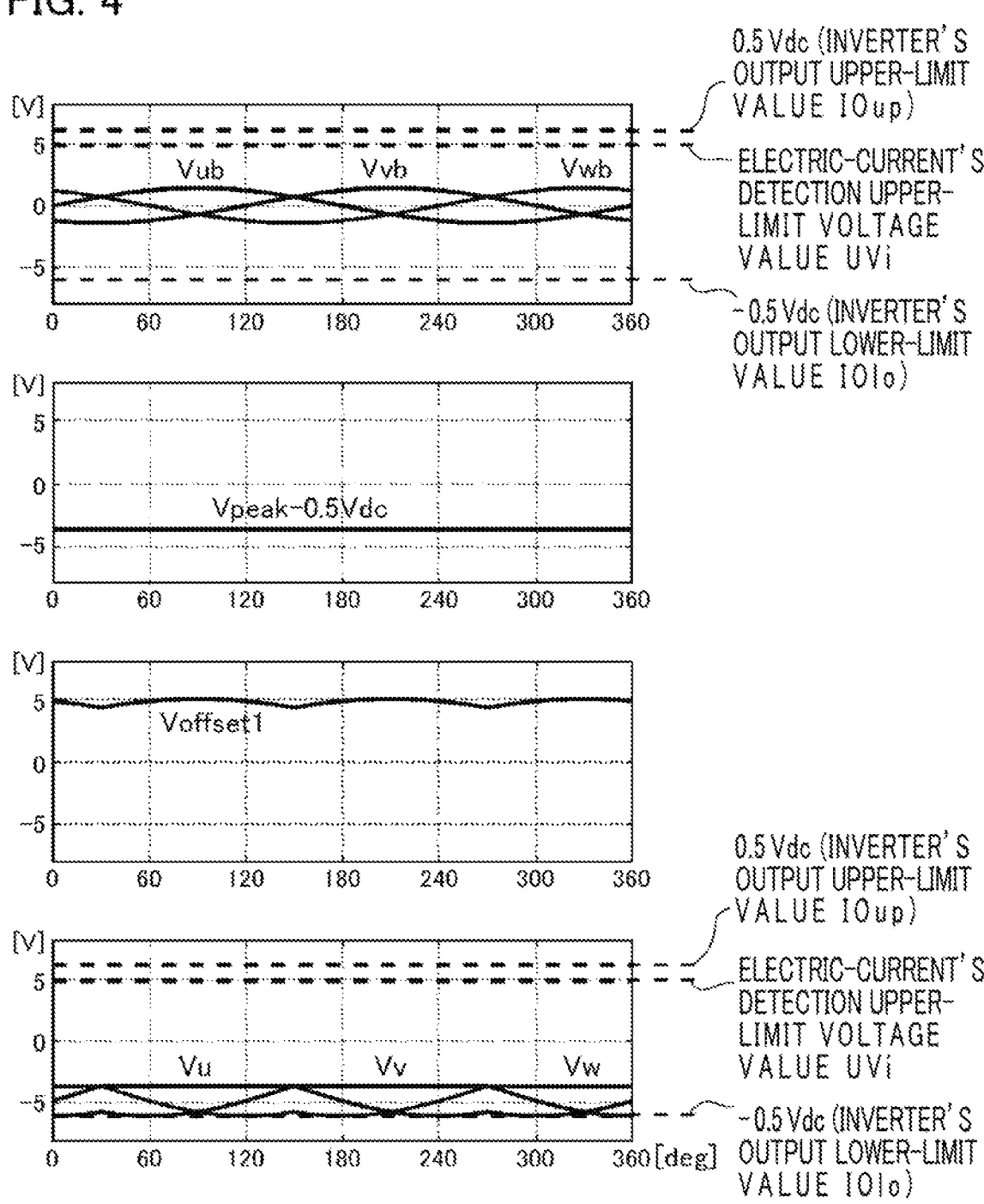
FIG. 4 is a diagram showing output waveforms of the power conversion device according to Embodiment 1.

FIG. 3 is an illustrative diagram for explaining each output waveform of the power conversion device when a modulation factor of three-phase basic voltage references Vub, Vvb and Vwb according to Embodiment 1 exceeds a modulation factor of an electric-current's detection upper-limit voltage value; and, in the modulation factor, FIG. 4 is an illustrative diagram for explaining each output waveform of the power conversion device when the modulation factor of three-phase basic voltage references Vub, Vvb and Vwb does not exceed the modulation factor of an electric-current's detection upper-limit voltage value.

In FIG. 3 and FIG. 4 each, three-phase basic voltage references Vub, Vvb and Vwb are indicated in the first stage from the top; a value in which a multiplication value of a DC voltage Vdc and 0.5 is subtracted from a peak voltage Vpeak is indicated in the second stage therefrom; a first voltage offset Voffset1 is indicated in the third stage therefrom; and three-phase modification voltage references Vu, Vv and Vw are indicated in the fourth stage therefrom.

Here, an inverter's output upper-limit value IOup is at Vdc/2, and an inverter's output lower-limit value IOlo is at −Vdc/2; and an electric-current's detection upper-limit value is determined by a lower limit value of a conduction time of the lower-arm switching elements Sun, Svn and Swn each required for electric current detection by the electric-current detecting resistance elements Ru, Rv and Rw, respectively. For example, when a lower limit value of a conduction time of the lower-arm switching elements Sun, Svn and Swn required for the electric current detection is at 5 μs, the ratio with respect to a carrier period Tc at the lower limit value of 5 μs is 10% when the carrier period is defined at 50 μs.

Therefore, as for the electric current detection, an lower-arm turn-on duty is required for 10% at a minimum, or in other words, an upper-arm turn-on duty is required to be at 90% or less. When the voltage Vdc is defined at 12 V, the output upper-limit value is at 6 V, and the 10% of 12 V is 1.2 V, so that an electric-current's detection condition becomes a voltage which is 1.2 V or lower than the upper-limit value of 6 V, namely, which is 4.8 V or less. Thus, this means that an electric-current's detection upper-limit voltage value UVi is at 4.8 V in this case.

According to FIG. 3 and FIG. 4, it can be understood that a value of a maximum phase among three-phase modification voltage references Vu, Vv and Vw made always constant at a value in which a multiplication value of a DC voltage Vdc and 0.5 is subtracted from a peak voltage Vpeak.

On an issue described above, because of a value of a maximum phase which varies in a six-times frequency in one period of electrical angle, the degradation timing of detection accuracy of the electric-current detecting resistance elements Ru, Rv and Rw is caused in the six-times frequency in one period of electrical angle, so that a problem or issue of vibration and that of audible noise are caused in the frequency; however, because the maximum phase is always kept constant by means of the modulation method according to the embodiment, an effect can be achieved as obtaining the reduction of vibration and audible noise in the six-times frequency in electrical angle.

Note that, as for a calculation method of a peak voltage, the peak voltage can also be calculated by using α-phase and β-phase fundamental or basic voltage references Vα and Vβ in which three-phase basic voltage references Vub, Vvb and Vwb are transformed into an α-axis and β-axis coordinate system by means of a known method of transformation of coordinate system, or by using d-phase and q-phase fundamental or basic voltage references Vd and Vq in which the three-phase basic voltage references Vub, Vvb and Vwb are similarly transformed into a d-axis and q-axis coordinate system by means of a known method of transformation of coordinate system. The computational expressions of a peak voltage Vpeak when three-phase basic voltage references Vub, Vvb and Vwb are transformed into the α-phase and β-phase basic voltage references Vα and Vβ by means of absolute transformation, or into the d-phase and q-phase basic voltage references Vd and Vq thereby are given by Expression (3) and Expression (4), respectively.

[Expression Figure-3]

$$V_{peak} = \sqrt{2(v_\alpha^2 + v_\beta^2)} \qquad (3)$$

[Expression Figure-4]

$$V_{peak} = \sqrt{(v_d^2 + v_q^2)} \qquad (4)$$

Next, the explanation will be made for the effects with respect to Patent Document 1. In Patent Document 1, an example is shown to perform the modulation in such a manner that, when the difference between a maximum phase and a minimum phase is smaller than an electric-current's detection upper-limit voltage value, the maximum phase becomes constant at a value determined in advance (electric-current's detection upper-limit voltage value), and that, when the difference between the maximum phase and the minimum phase is larger than the electric-current's detection upper-limit voltage value, the minimum phase becomes constant at a value determined in advance (inverter's output lower-limit value). In that example, when the difference between the maximum phase and the minimum phase is larger than an electric-current's detection upper-limit voltage value UVi, the maximum phase results in having peaks at six times in one period of electrical angle when the minimum phase is modulated at a constant value determined in advance.

In this case, at the instant at which the maximum phase takes on its peak, a turn-on time of a lower-arm switching element becomes the minimum, so that, at that instant, electric current detecting accuracy becomes the worst. When an electric-current feedback control is performed by using an electric current detected at that time, the instants appear at six times in one period of electrical angle at each of which the detecting accuracy becomes the worst, so that, at those instants, the controllability of the electric current is reduced, and the vibration of the electric current is caused in a six-times frequency in electrical angle. When a torque ripple in a six-times frequency in electrical angle is primarily caused due to a electric motor control or the like, degradation of the torque ripple is further introduced due to the oscillation of the electric current in the six-times frequency in electrical angle caused by the degradation of the electric current detecting accuracy, so that a problem or issue of vibration and/or audible noise become significant.

In the embodiment, the maximum phase becomes constant at a value in which a multiplication value between a DC voltage Vdc and "0.5" is subtracted from a peak voltage Vpeak as exactly described above, so that it becomes possible to reduce vibration of electric current in a six-times frequency in electrical angle originated as a cause in electric current detecting accuracy. In Patent Document 1, a method of modulating an average value between a maximum phase and a minimum phase as a superimposed voltage is also proposed when the difference between the maximum phase and the minimum phase exceeds the magnitude of a power source voltage. However, even in the modulation method, maximum phase peaks appear at six times in one period of electrical angle, and so, a solution to a problem or issue is not satisfied when the method is presumably applied to at a time when the difference between a maximum phase and a minimum phase does not exceed the magnitude of a power source voltage.

In addition, when an upper-level held modulation described in Patent Document 1 is only used, it is possible to avoid that maximum phase peaks appear at six times in one period of electrical angle. However, because the modulation is carried out so that the maximum phase becomes constant at a value determined in advance, a minimum phase of three-phase modification voltage references falls below an inverter's output lower-limit when a modulation factor of three-phase basic voltage references is larger than a modulation factor of a value determined in advance. When an output lower-limit is fallen below, a line-to-line voltage(s) is distorted, so that another problem or issue is caused in which vibration and/or audible noise increase. From this viewpoint, the modulation method of the embodiment performs the modulation so that, upon the calculation of a peak voltage Vpeak, a maximum phase becomes constant at a value in which a multiplication value of a DC voltage Vdc and 0.5 is subtracted from the peak voltage Vpeak as shown in FIG. 3, whereby the maximum phase becomes constant at a value exceeding an electric-current's detection upper-limit voltage value UVi as shown in FIG. 3, so that it is possible to avoid so that the minimum phase falls below the inverter's lower limit.

In addition, as for an upper-level held modulation described in Patent Document 1, when a value determined in advance is defined as an inverter's output upper-limit value, a minimum phase of three-phase modification voltage references does not fall below an inverter's output lower-limit value.

However, when the amplitudes of three-phase basic voltage references are small, the modulation is performed so that a maximum phase becomes at an inverter's output upper-limit value, so that the minimum phase inevitably takes also on a value in vicinity to the inverter's output upper-limit value; and then, turn-on times of the lower-arm switching elements of all of the three phases become short, so that electric current detecting accuracy on all of the three phases is significantly degraded. From this viewpoint, the modulation method of the embodiment performs the modulation so that, upon the calculation of a peak voltage Vpeak, a maximum phase takes on a value in which a multiplication value of a DC voltage Vdc and 0.5 is subtracted from the peak voltage Vpeak as shown in FIG. 4, and so, the maximum phase is not unnecessary kept constant at a large value, so that the degradation of the electric current detecting accuracy on all of the three phases can be avoided.

Also in Patent Document 2, an example is shown to use only an upper-level held modulation; however, it is similar to Patent Document 1 to a point in which a value to keep a maximum phase at a constant is required to be determined in advance, so that the comparison is similar in comparison also with the embodiment. In addition, in another modification example of Patent Document 2, an example is also shown to perform the modulation in such a manner that, when the amplitudes of three-phase basic voltage references are smaller than a threshold vale(s), the maximum phase becomes constant at an electric-current's detection upper-limit voltage value, whereas, when the amplitudes of the three-phase basic voltage references are larger than the threshold vale(s), the maximum phase becomes constant at an inverter's output upper-limit value.

In that example, there exists the instant at which the amplitudes of three-phase basic voltage references are smaller than a threshold value(s), so that, when at the next instant at which the amplitudes thereof become larger than the threshold value(s) for example, a value of a maximum phase of three-phase modification voltage references results in jumping from an electric-current's detection upper-limit value toward an inverter's output upper-limit value. As a matter of course, in the opposite case, a value of the maximum phase of the three-phase modification voltage references results in jumping from an inverter's output upper-limit value toward the electric-current's detection upper-limit value. Namely, in this example, the voltage offset may become discontinuous, and so, there is also a problem or an issue of introducing the increase of vibration and audible noise originated as a cause in the discontinuity. On the other hand, according to the method of the embodiment, there is no occasion in which the voltage offset becomes discontinuous.

As described above, according to Embodiment 1, the modulation control unit calculates a first voltage offset on the basis of a DC voltage, on that of a maximum phase and on that of sum of squares of three-phase basic voltage references, when the three-phase basic voltage references are defined as a maximum phase, an intermediate phase and a minimum phase in decreasing order of value, and outputs three-phase modification voltage references by subtracting the first voltage offset from the three-phase basic voltage references, whereby an inverter's output lower-limit is not fallen below when the amplitudes of the three-phase basic voltage references are large, and electric current detecting accuracy of the three phases does not result in degrades even when the amplitudes of the three-phase basic voltage references are small, so that there is no occasion in which the voltage offset becomes discontinuous.

What is more, it is avoided to observe that peaks of a maximum phase appear at six times in one period of electrical angle, whereby it is possible to prevent the vibration of six-times frequency in one period of electrical angle of an electric current due to the occurrence in which the degradation timing of electric current detecting accuracy is caused at six times in the one period of electrical angle.

Embodiment 2

In Embodiment 1, as for a first voltage offset, the modulation is performed so that the maximum phase becomes constant at a value in which a multiplication value between a DC voltage Vdc and "0.5" is subtracted from a peak voltage Vpeak. In this case, when the amplitudes of the three-phase basic voltage references Vub, Vvb and Vwb each are small as shown in FIG. 4, the three-phase modification voltage references Vu, Vv and Vw result in shifting toward a side of an inverter's output lower-limit value IOlo. According to this arrangement, electric current detecting accuracy is enhanced; however, a conduction time in the lower arms each becomes longer, so that heat liberation in the lower arms becomes larger. When a problem such as heat liberation or the like is caused due to the shift toward a side of the inverter's output lower-limit value IOlo, the modulation may be performed so that the maximum phase shifts from a value in which a multiplication value between a DC voltage Vdc and "0.5" is subtracted from a peak voltage Vpeak as will be described below.

Figure 5:
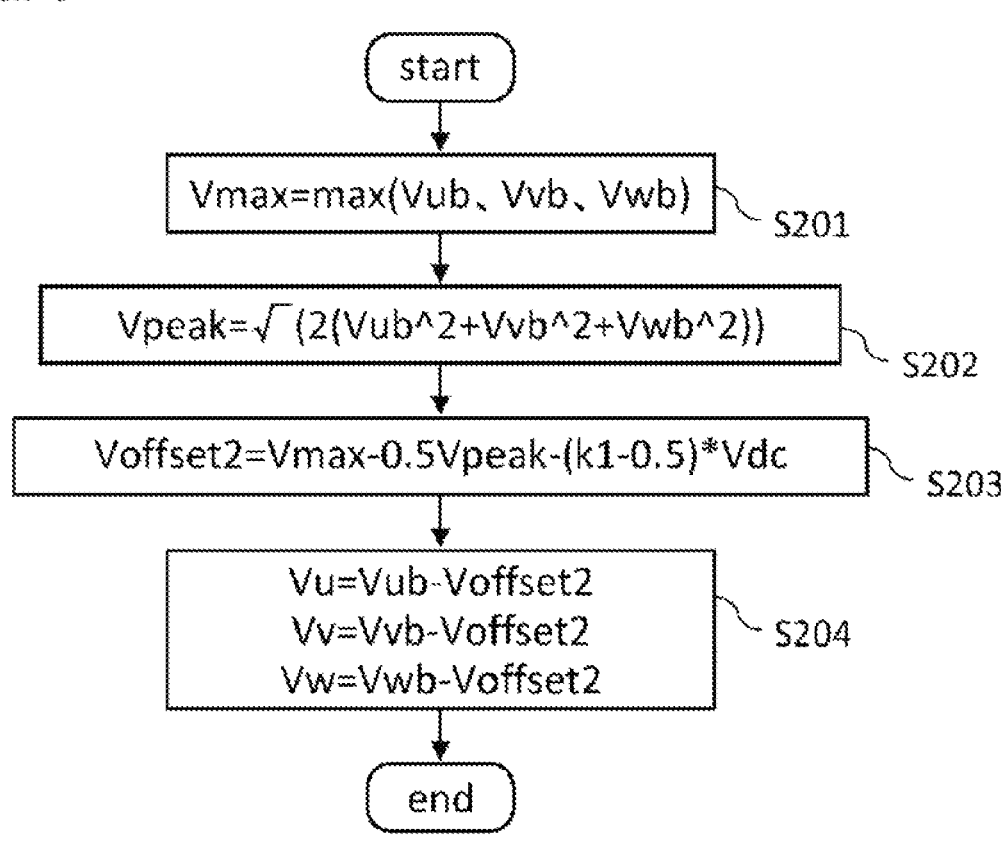
FIG. 5 is a flowchart showing calculation processing of a modulation control unit in an electrical power conversion device according to Embodiment 2.

The explanation will be omitted for constituent items or portions redundant to those of Embodiment 1. FIG. 5 is a flowchart showing calculation processing of the modulation control unit 6 in Embodiment 2. At Step S201 in FIG. 5, a maximum phase voltage Vmax is calculated when three-phase basic voltage references among the three-phase basic voltage references Vub, Vvb and Vwb are defined as a maximum phase, an intermediate phase and a minimum phase in decreasing order of value.

At Step S202, the positive square root of a value in which sum of squares of the three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Va and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S203, a value in which the peak voltage Vpeak calculated at Step S202 is multiplied by "0.5" is calculated is subtracted from the maximum phase voltage Vmax calculated at Step S201, and which is further subtracted by a value in which a DC voltage Vdc is multiplied by a value in which "0.5" is subtracted from a first constant k1, so that a second voltage offset Voffset2 is calculated.

At Step S204, the second voltage offset Voffset2 is individually subtracted from the three-phase basic voltage references Vub, Vvb and Vwb, so that three-phase modification voltage references Vu, Vv and Vw are calculated, respectively. The second voltage offset Voffset2 is given by Expression (5).

[Expression Figure-5]

$$V_{offset2}=V_{max}-0.5V_{peak}-(k_1-0.5)V_{dc} \qquad (5)$$

Here, a first constant k1 takes on a numerical value which determines a central value of three-phase modification voltage references Vu, Vv and Vw. For example, when an output allowance range of an inverter is from −6 V to 6 V, and when a central value of the three-phase modification voltage references Vu, Vv and Vw is defined at the central value of the output allowance range of the inverter being 0 V, the first constant is set as "k1=0.5." In the embodiment, it is defined that k1=0.5, whereby three-phase modification voltage references do not exceed an output upper limit nor falls below an output lower limit, if a modulation factor of the three-phase basic voltage references is at "1" or less.

In FIG. 6, each output waveform of the power conversion device is shown when the parameter k1 is defined as "k1=0.5" in Embodiment 2. According to the modulation method, a central value of three-phase modification voltage references Vu, Vv and Vw takes on "(k1−0.5)*Vdc." In FIG. 6, three-phase basic voltage references Vub, Vvb and Vwb are indicated in the first stage from the top; a value in which a multiplication value of a DC voltage Vdc and 0.5 is subtracted from a peak voltage Vpeak is indicated in the second stage therefrom; a second voltage offset Voffset2 is indicated in the third stage therefrom; and three-phase modification voltage references Vu, Vv and Vw are indicated in the fourth stage therefrom.

According to FIG. 6, by shifting the three-phase modification voltage references Vu, Vv and Vw toward a side of an inverter's output upper-limit value IOup from a state of Embodiment 1, a conduction time in the lower arms each becomes shorter, so that the amount of heat liberation is reduced. In addition, it is avoided to observe that peaks of a maximum phase appear at six times in one period of electrical angle, whereby it is possible to prevent the vibration of six-times frequency in one period of electrical angle of an electric current due to the occurrence in which the degradation timing of electric current detecting accuracy is caused at six times in the one period of electrical angle.

Embodiment 3

In Embodiment 1, as for a first voltage offset, the modulation is performed so that the maximum phase becomes constant at a value in which a multiplication value between a DC voltage Vdc and "0.5" is subtracted from a peak voltage Vpeak. In this case, when the amplitudes of the three-phase basic voltage references each are small as shown in FIG. 4, the three-phase modification voltage references result in shifting toward a side of an inverter's output lower-limit. According to this arrangement, electric current detecting accuracy is enhanced; however, a conduction time in the lower arms each becomes longer, so that heat liberation in the lower arms becomes larger. When a problem such as heat liberation or the like is caused due to the shift toward a side of the inverter's output lower-limit, the control may be performed so that a first voltage offset is set to zero when a modulation factor of three-phase basic voltage references falls below a modulation-factor threshold value as will be described below.

Figure 7:
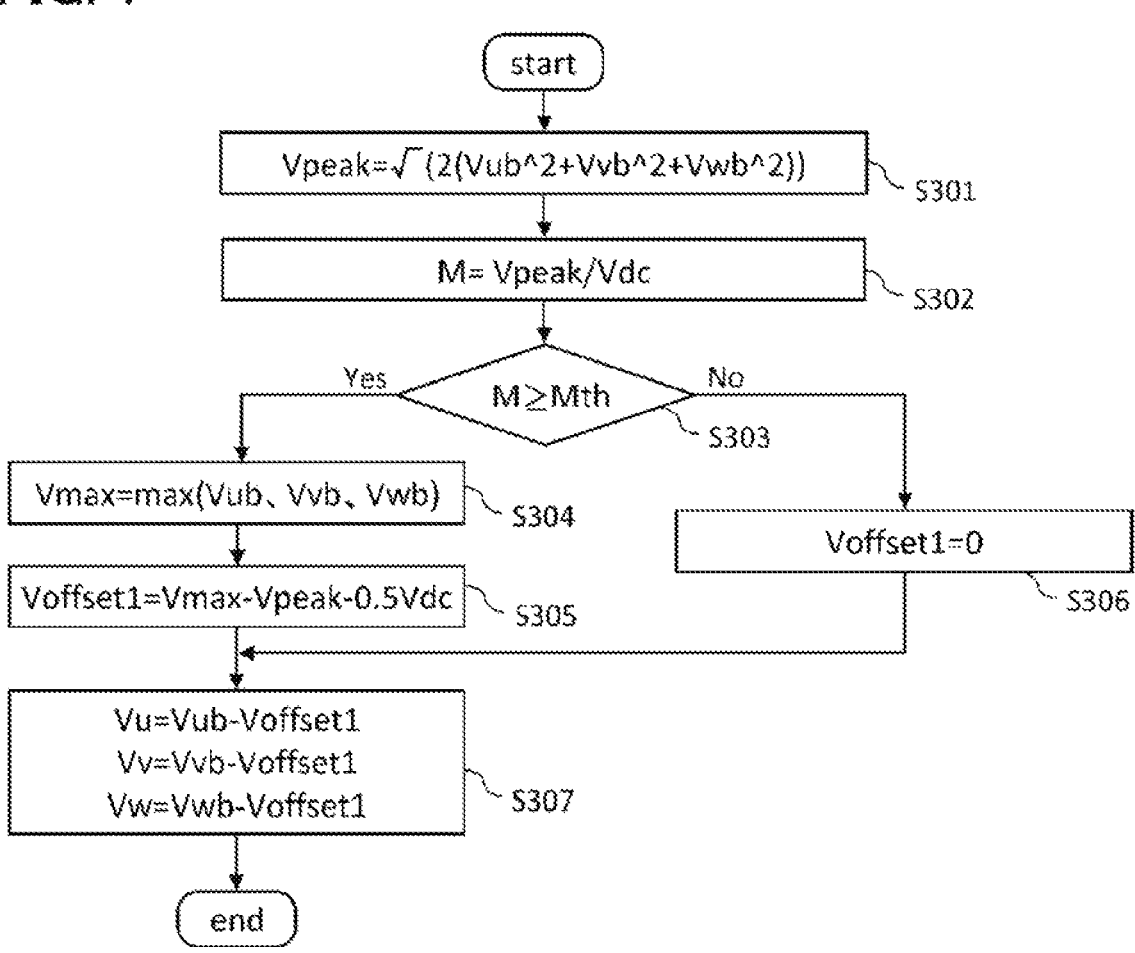
FIG. 7 is a flowchart showing calculation processing of a modulation control unit in an electrical power conversion device according to Embodiment 3.

The explanation will be omitted for constituent items or portions redundant to those of Embodiment 1. FIG. 7 is a flowchart showing calculation processing of the modulation control unit 6 in Embodiment 3. At Step S301 in FIG. 7, the positive square root of a value in which sum of squares of three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Vα and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S302, a modulation factor M is calculated by dividing a peak voltage Vpeak acquired at Step S301 by a DC voltage Vdc.

At Step S303, determination is performed whether or not the modulation factor M acquired at Step S302 is larger than a modulation-factor threshold value Mth. Here, the parameter Mth is set at a value capable of avoiding that a maximum phase of three-phase basic voltage references exceeds a voltage value at an electric-current detection upper-limit. For example, when it is defined that an electric-current's detection upper-limit is at duty of 90%, the parameter Mth is set at a value of "0.4 √3" or less, because an electric-current's detection upper-limit voltage value UVi takes on "(0.9−0.5)*Vdc=0.4 Vdc."

When determination is performed so that the modulation factor M is at a value of a modulation-factor threshold value Mth or more at Step S303, the processing proceeds to Step S304. At Step S304, a maximum phase voltage Vmax is calculated when three-phase basic voltage references among the three-phase basic voltage references Vub, Vvb and Vwb are defined as a maximum phase, an intermediate phase and a minimum phase in decreasing order of value.

At Step S305, the peak voltage Vpeak calculated at Step S301 is subtracted from the maximum phase voltage Vmax calculated at Step S304, and, from the value, a value in which a DC voltage Vdc is multiplied by "0.5" is calculated is subtracted, so that a first voltage offset Voffset1 is calculated.

When determination is performed so that the modulation factor M is smaller than a modulation-factor threshold value Mth at Step S303, the processing proceeds to Step S306. At Step S306, the first voltage offset Voffset1 is set "0."

At Step S307, the first voltage offset Voffset1 calculated at Step S305 or Step S306 is individually subtracted from the three-phase basic voltage references Vub, Vvb and Vwb, so that three-phase modification voltage references Vu, Vv and Vw are calculated, respectively. The modulation factor M is given by Expression (6).

[Expression Figure–6]

$$M = \frac{V_{peak}}{V_{dc}} \tag{6}$$

According to Embodiment 3, when a modulation factor M is smaller than a modulation-factor threshold value Mth, three-phase modification voltage references Vu, Vv and Vw are coincident with three-phase basic voltage references Vub, Vvb and Vwb though it is not newly shown in another figure, so that an upper-arm's conduction mean time of each phase becomes equal to a lower-arm's conduction mean time of each phase. In addition, when a modulation factor M becomes at a value of a modulation-factor threshold value Mth or more, it is avoided to observe that peaks of a maximum phase appear at six times in one period of electrical angle, whereby it is possible to prevent the vibration of six-times frequency in one period of electrical angle of an electric current due to the occurrence in which the degradation timing of electric current detecting accuracy is caused at six times in the one period of electrical angle.

Embodiment 4

In Embodiment 3, when a modulation factor of three-phase basic voltage references falls below a modulation-factor threshold value, the modulation is performed so that the voltage offset is set at "0"; however, in that case, the modulation may be performed so that a maximum phase shifts from a value in which a multiplication value between a DC voltage Vdc and "0.5" is subtracted from a peak voltage Vpeak.

Figure 8:
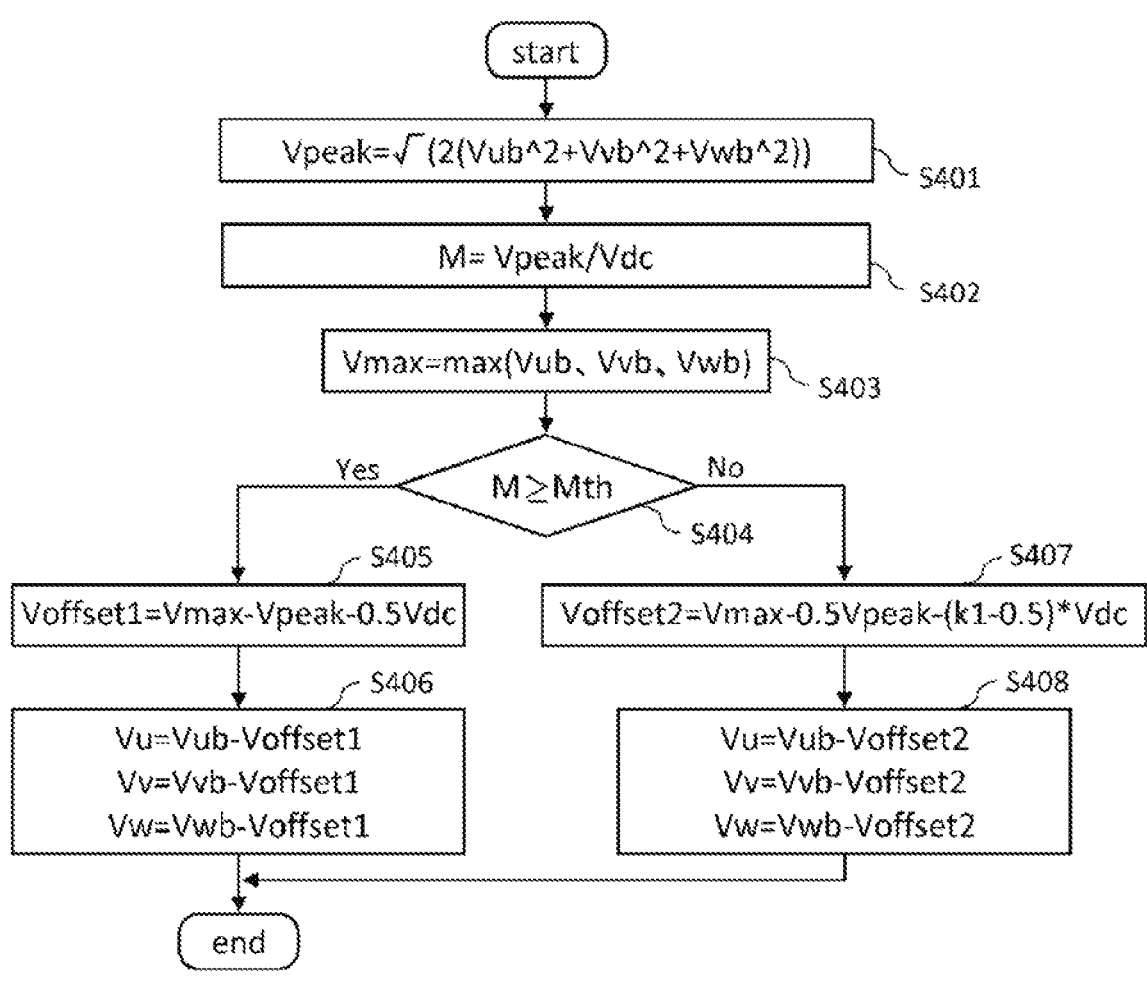
FIG. 8 is a flowchart showing calculation processing of a modulation control unit in an electrical power conversion device according to Embodiment 4.

The explanation will be omitted for constituent items or portions redundant to those of Embodiment 3. FIG. 8 is a flowchart showing calculation processing of the modulation control unit 6 in Embodiment 4. At Step S401 in FIG. 8, the positive square root of a value in which sum of squares of three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Vα and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S402, a modulation factor M is calculated by dividing a peak voltage Vpeak acquired at Step S401 by a DC voltage Vdc.

At Step S403, a maximum phase voltage Vmax is calculated when three-phase basic voltage references among the three-phase basic voltage references Vub, Vvb and Vwb are defined as a maximum phase, an intermediate phase and a minimum phase in decreasing order of value.

At Step S404, determination is performed whether or not the modulation factor M acquired at Step S402 is larger than a modulation-factor threshold value Mth. Here, the parameter Mth is set at a modulation factor of a voltage value at an electric-current detection upper-limit or less. For example, when an electric-current's detection upper-limit is at the duty 90%, parameter Mth is set at a value of "0.9" or less.

When determination is performed so that a modulation factor M is at a value of a modulation-factor threshold value Mth or more at Step S404, the processing proceeds to Step S405.

At Step S405, the peak voltage Vpeak calculated at Step S401 is subtracted from the maximum phase voltage Vmax calculated at Step S403, and, from the value, a value in which a DC voltage Vdc is multiplied by "0.5" is calculated is subtracted, so that a first voltage offset Voffset1 is calculated.

At Step S406, the first voltage offset Voffset1 calculated at Step S405 is individually subtracted from the three-phase basic voltage references Vub, Vvb and Vwb, so that three-phase modification voltage references Vu, Vv and Vw are calculated, respectively.

When determination is performed so that a modulation factor M is smaller than a modulation-factor threshold value Mth at Step S404, the processing proceeds to Step S407.

At Step S407, a value in which the peak voltage Vpeak calculated at Step S401 is multiplied by "0.5" is calculated is subtracted from the maximum phase voltage Vmax calculated at Step S403, and which is further subtracted by a value in which a DC voltage Vdc is multiplied by a value in which "0.5" is subtracted from a first constant k1, so that a second voltage offset Voffset2 is calculated.

At Step S408, the second voltage offset Voffset2 calculated at Step S407 is individually subtracted from the three-phase basic voltage references Vub, Vvb and Vwb, so that three-phase modification voltage references Vu, Vv and Vw are calculated, respectively. The second voltage offset Voffset2 is given by Expression (5).

Here, a first constant k1 takes on a numerical value which determines a central value of three-phase modification voltage references Vu, Vv and Vw. In the embodiment, by setting the parameter k1 at a value in which a modulation-factor threshold value Mth is multiplied by "0.5," the maximum phase of three-phase modification voltage references by means of a second voltage offset Voffset2 becomes a voltage value corresponding to a modulation-factor threshold value Mth when a modulation factor M of the three-phase basic voltage references approaches to a modulation-factor threshold value Mth, the voltage offset becomes continuous even when it is changed over to a first voltage offset Voffset1.

Figure 9:
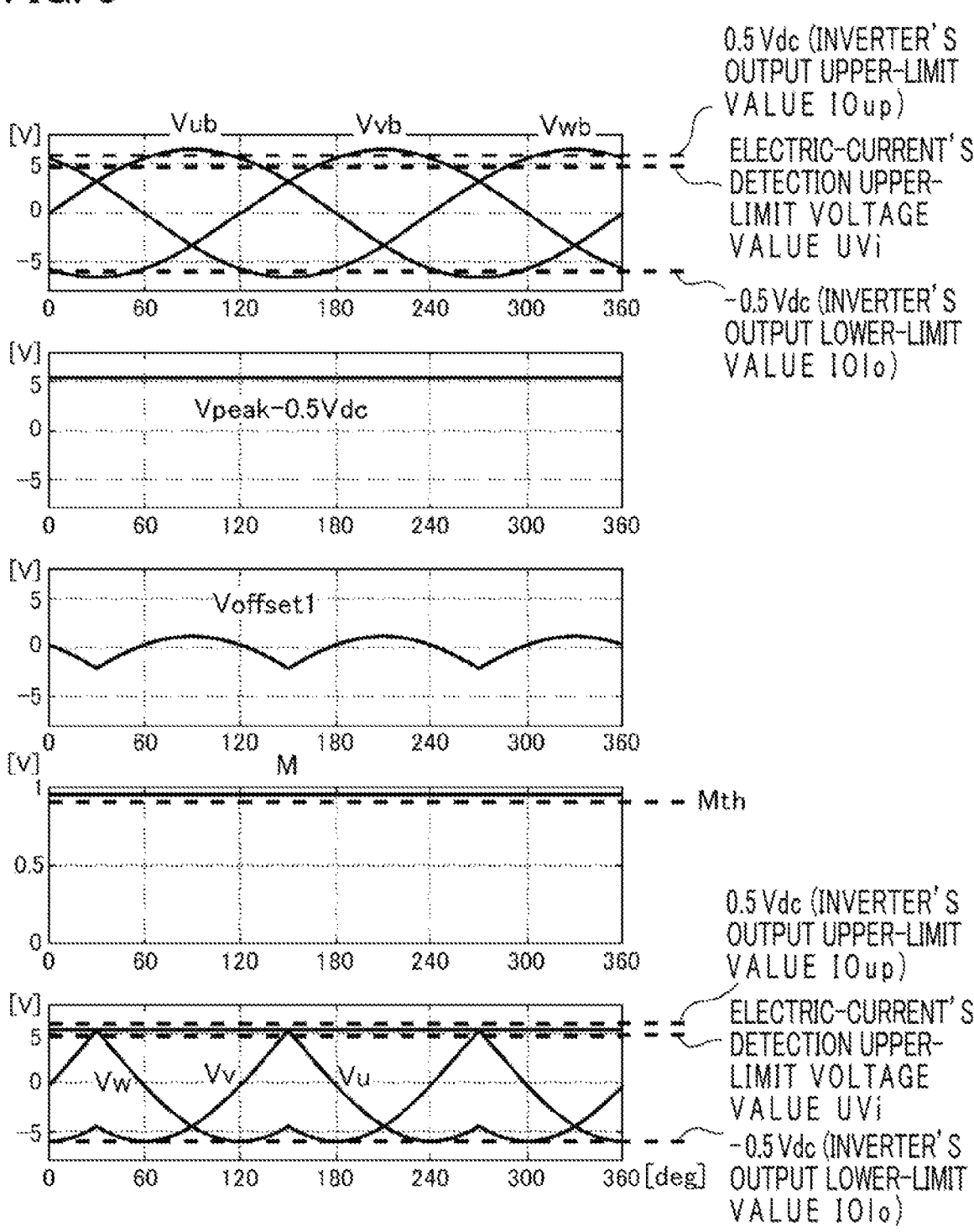
FIG. 9 is a diagram showing output waveforms of the power conversion device according to Embodiment 4.
Figure 10:
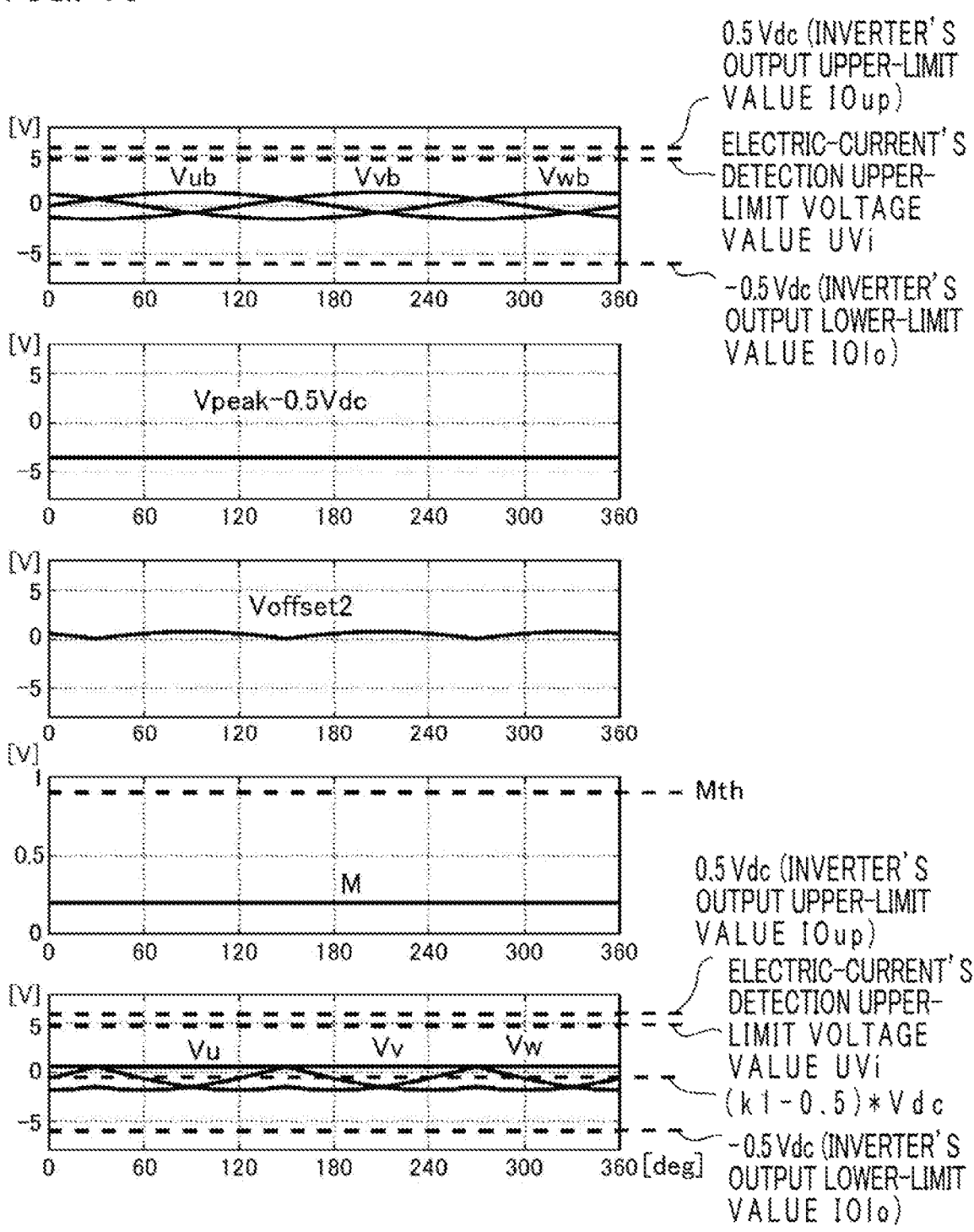
FIG. 10 is a diagram showing output waveforms of the power conversion device according to Embodiment 4.

In FIG. 9 and FIG. 10, examples are shown in each of which a modulation-factor threshold value Mth is defined at "0.9," and the parameter k1 is set at "0.45" in which the modulation-factor threshold value Mth is multiplied by "0.5." In FIG. 9, a modulation factor M is made at a modulation-factor threshold value Mth or more; as for three-phase modification voltage references Vu, Vv and Vw, their minimum value takes on an inverter's lower-limit; and the maximum phase becomes constant at a value of "Vpeak– 0.5 Vdc." In FIG. 10, a modulation factor M is made smaller than a modulation-factor threshold value Mth; and three-phase modification voltage references Vu, Vv and Vw take on their median value of "(k1−0.5) Vdc."

According to the embodiment, it is avoided to observe that peaks of a maximum phase appear at six times in one period of electrical angle, whereby it is possible to prevent the vibration of six-times frequency in one period of electrical angle of an electric current due to the occurrence in which the degradation timing of electric current detecting accuracy is caused at six times in the one period of electrical angle.

Embodiment 5

Figure 11:
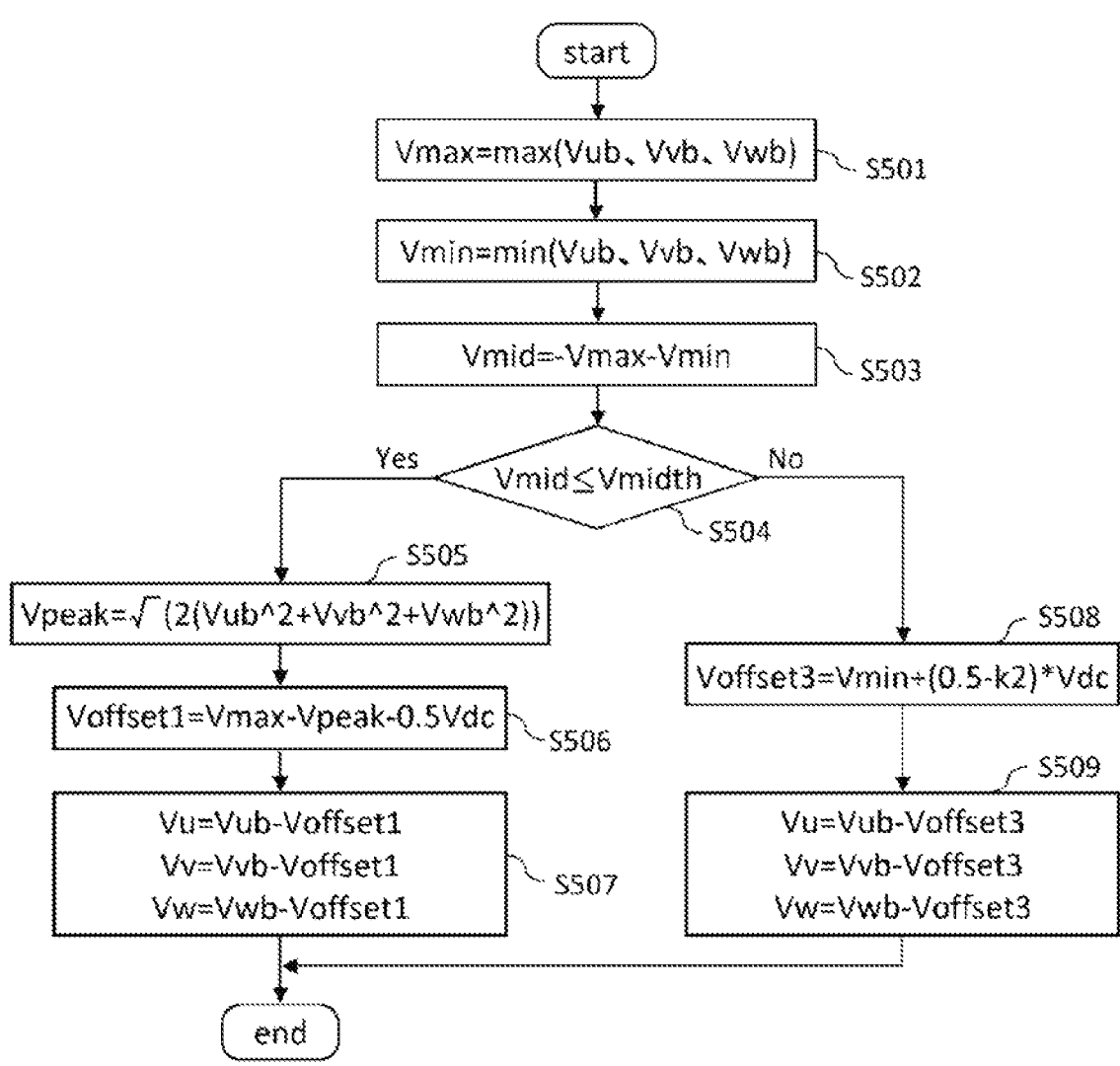
FIG. 11 is a flowchart showing calculation processing of a modulation control unit in an electrical power conversion device according to Embodiment 5.

Hereinafter, the explanation will be made for Embodiment 5; however, the explanation will be omitted for constituent items or portions redundant to those of Embodiment 1. FIG. 11 is a flowchart showing the calculation of the modulation control unit 6 in Embodiment 5.

At Step S501 in FIG. 11, a maximum phase voltage Vmax is calculated when three-phase basic voltage references among the three-phase basic voltage references Vub, Vvb and Vwb are defined as a maximum phase, an intermediate phase and a minimum phase in decreasing order of value. At Step S502, a minimum phase voltage Vmin is calculated. At Step S503, an intermediate phase voltage Vmid is calculated from the maximum phase voltage Vmax and the minimum phase voltage Vmin. At Step S504, determination is performed whether or not the intermediate phase voltage Vmid acquired at Step S503 is at an intermediate phase voltage threshold value Vmidth or less. Here, the intermediate phase voltage threshold value Vmidth is set at "0."

When determination is performed so that the intermediate phase voltage Vmid is at a value of the intermediate phase voltage threshold value Vmidth or less at Step S504, the processing proceeds to Step S505.

At Step S505, the positive square root of a value in which sum of squares of the three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Vα and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S506, the peak voltage Vpeak calculated at Step S505 is subtracted from the maximum phase voltage Vmax calculated at Step S501, and, from the value, a value in which a DC voltage Vdc is multiplied by "0.5" is calculated is subtracted, so that a first voltage offset Voffset1 is calculated.

At Step S507, the first voltage offset Voffset1 calculated at Step S506 is individually subtracted from the three-phase basic voltage references Vub, Vvb and Vwb, so that three-phase modification voltage references Vu, Vv and Vw are calculated, respectively.

When determination is performed so that the intermediate phase voltage Vmid is larger than the intermediate phase voltage threshold value Vmidth at Step S504, the processing proceeds to Step S508.

At Step S508, a multiplication value between a value in which a second constant k2 is subtracted from "0.5" and a DC voltage Vdc is added to the minimum phase voltage Vmin calculated at Step S502, so that a third voltage offset Voffset3 is calculated.

At Step S509, the third voltage offset Voffset3 calculated at Step S508 is individually subtracted from the three-phase basic voltage references Vub, Vvb and Vwb, so that three-phase modification voltage references Vu, Vv and Vw are calculated, respectively.

The third voltage offset Voffset3 is given by Expression (7).

[Expression Figure-7]

$$V_{offset3} = V_{min} + (0.5 - k_2) V_{dc} \qquad (7)$$

Here, a second constant k2 is a numerical value which determines a value of a minimum phase of three-phase modification voltage references Vu, Vv and Vw. When the minimum phase is made constant at an inverter's output lower-limit value, it is defined that the second constant "k2=0." In a case in which the two-phase modulation is avoided, the second constant k2 is defined at a minimum pulse duty of PWM; for example, when a carrier period is at 50 μs, and when a minimum pulse width of an inverter is at 0.5 μs, parameter k2 is set so that "0.5/50=0.01."

Figure 12:
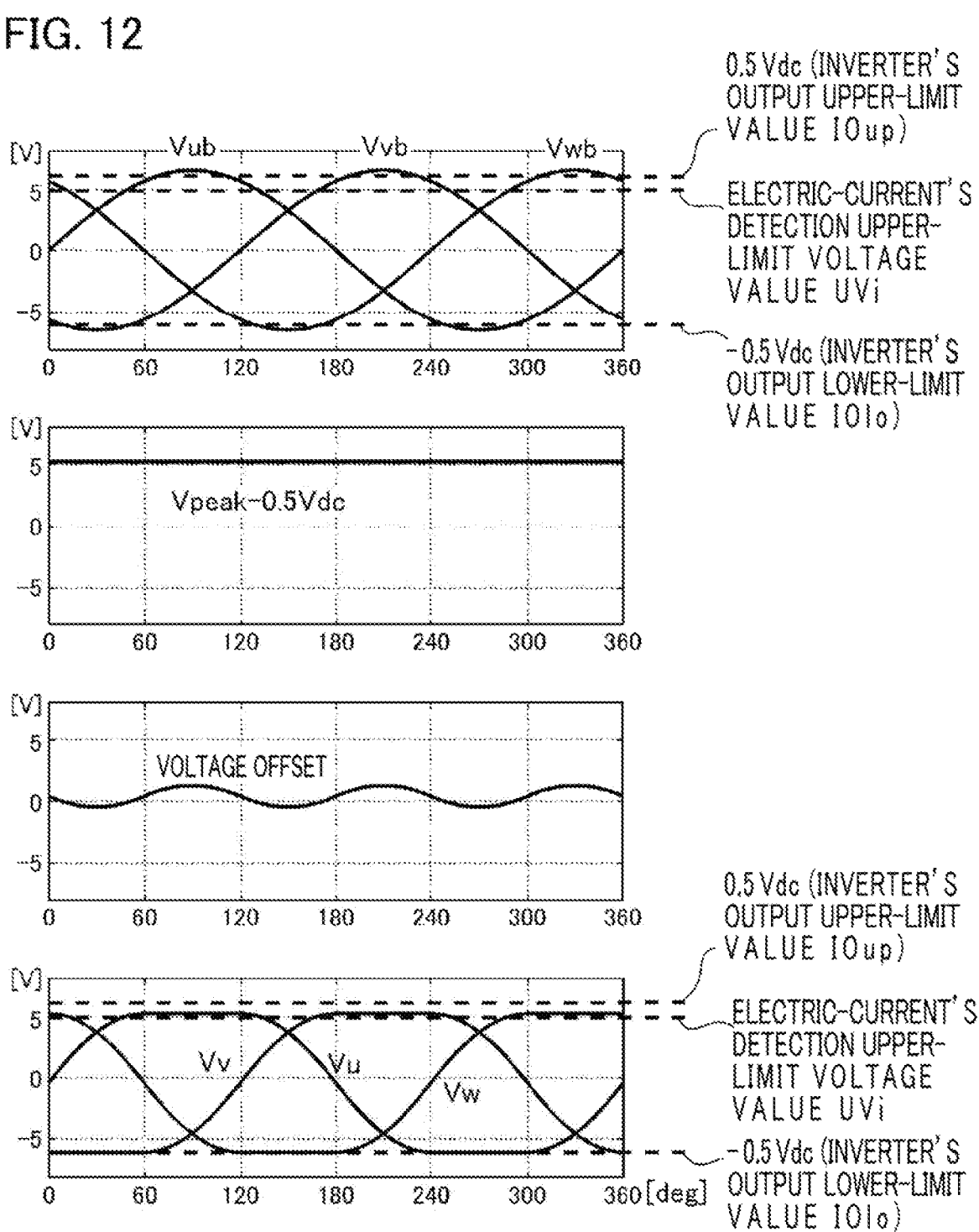
FIG. 12 is a diagram showing output waveforms of the power conversion device according to Embodiment 5.

In FIG. 12, an example is shown in which it is defined that the second constant "k2=0." In FIG. 12, a minimum phase takes on a constant value at the timing when the intermediate phase is larger than the intermediate phase voltage threshold value Vmidth, and a maximum phase becomes constant at the timing when the intermediate phase is at the intermediate phase voltage threshold value Vmidth or less. As exactly shown in FIG. 12, it is avoided to observe that peaks on the maximum phase of three-phase modification voltage references appear at six times in one period of electrical angle, so that it is possible to prevent the vibration of six-times frequency in one period of electrical angle of an electric current due to the occurrence in which the degradation timing of electric current detecting accuracy is caused at six times in the one period of electrical angle.

Embodiment 6

Hereinafter, the explanation will be made for Embodiment 6; however, the explanation will be omitted for constituent items or portions redundant to those of Embodiment 5. When a modulation factor of three-phase basic voltage references becomes in vicinity to "1," a maximum phase takes on in vicinity to an inverter's output upper-limit, so that the duty approaches to 100%. In electric current detection, when the electric current detection is carried out at the instant at which a carrier wave takes on the maximum value, the electric current detection cannot be carried out because the maximum phase is in vicinity to the 100% at its duty, so that the other two phases result in being detected.

Figure 13:
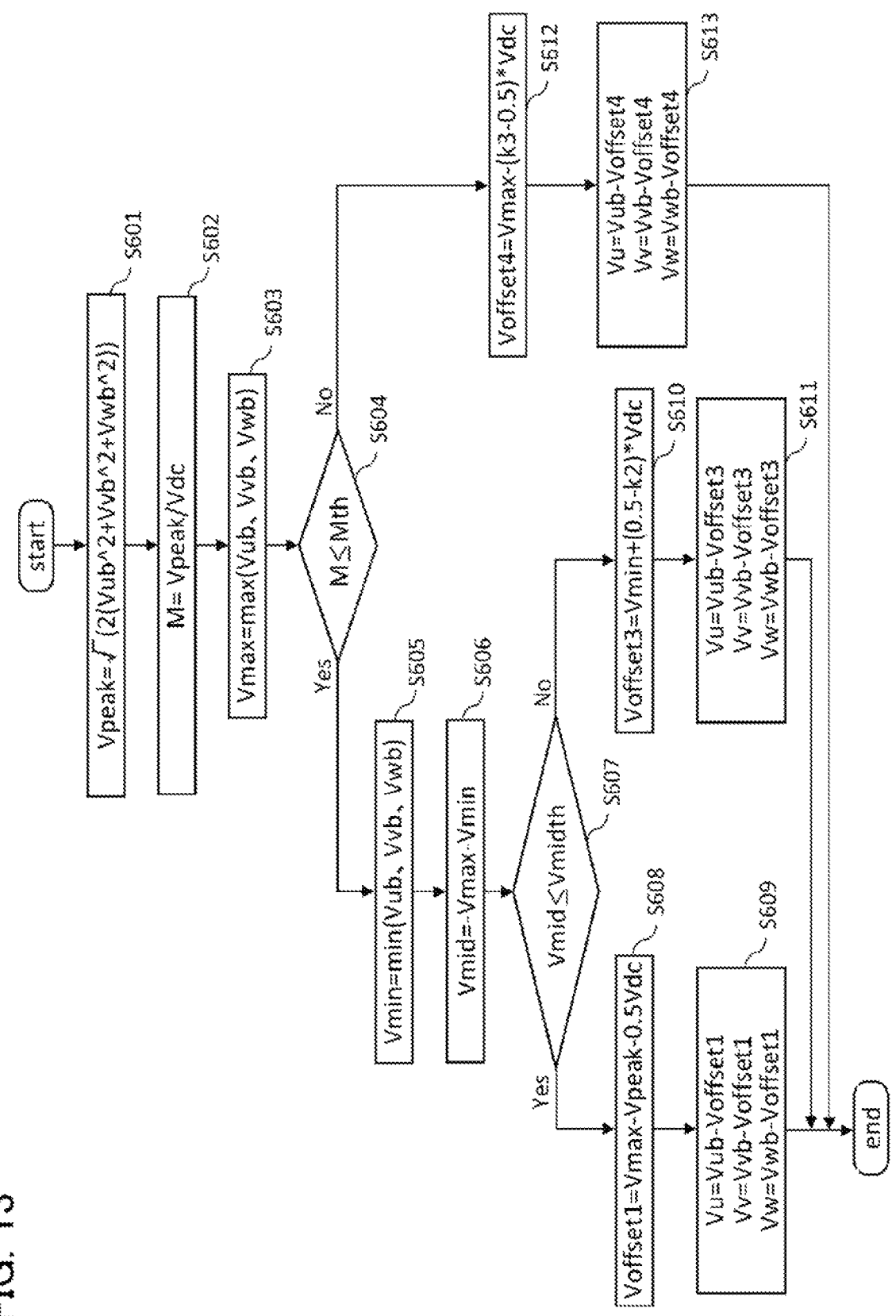
FIG. 13 is a flowchart showing calculation processing of a modulation control unit in an electrical power conversion device according to Embodiment 6.

At this time, when a maximum phase duty is not completely at 100%, switching is also caused in the maximum phase. In this case, because switching timing of a maximum phase occurs in vicinity to the instant at which a carrier wave takes on the maximum value, there exists a possibility in which switching noise of the maximum phase exerts bad influence on the electric current detection of the other two phases. In order to avoid the bad influence due to the switching noise, the maximum phase is made constant at an inverter's output upper-limit value, and the duty is made at 100% when a modulation factor of the three-phase basic voltage references takes on a value in vicinity to "1," whereby it becomes possible to adopt a method not causing switching. FIG. 13 is a flowchart showing calculation processing of the modulation control unit 6 in Embodiment 6.

At Step S601 in FIG. 13, the positive square root of a value in which sum of squares of three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Vα and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S602, a modulation factor M is calculated by dividing a peak voltage Vpeak by a DC voltage Vdc.

At Step S603, a maximum phase voltage Vmax is calculated when three-phase basic voltage references among the three-phase basic voltage references Vub, Vvb and Vwb are defined as a maximum phase, an intermediate phase and a minimum phase in decreasing order of value.

At Step S604, determination is performed whether or not the modulation factor M is at a modulation-factor threshold value Mth or less. As for the modulation-factor threshold value Mth, the modulation-factor threshold value is set at a value or more of a modulation factor of electric-current's detection upper-limit, and also set at a value or less of a modulation factor in which the inverter is capable of performing its outputs.

When determination is performed so that the modulation factor M is at a value of a modulation-factor threshold value Mth or less at Step S604, the processing proceeds to Step S605.

At Step S605, a minimum phase voltage Vmin is calculated. At Step S606, an intermediate phase voltage Vmid is calculated from the maximum phase voltage Vmax and the minimum phase voltage Vmin. At Step S607, determination is performed whether or not the intermediate phase voltage Vmid is at an intermediate phase voltage threshold value Vmidth or less. Here, the intermediate phase voltage threshold value Vmidth is set at "0."

When determination is performed so that the intermediate phase voltage Vmid is at a value of the intermediate phase voltage threshold value Vmidth or less at Step S607, the processing proceeds to Step S608.

At Step S608, the peak voltage Vpeak is subtracted from the maximum phase voltage Vmax, and, from the value, a value in which a DC voltage Vdc is multiplied by "0.5" is calculated is subtracted, so that a first voltage offset Voffset1 is calculated.

At Step S609, the first voltage offset Voffset1 calculated at Step S608 is individually subtracted from the three-phase basic voltage references Vub, Vvb and Vwb, so that three-phase modification voltage references Vu, Vv and Vw are calculated, respectively.

When determination is performed so that the intermediate phase voltage Vmid is larger than the intermediate phase voltage threshold value Vmidth at Step S607, the processing proceeds to Step S610.

At Step S610, a multiplication value between a value in which a second constant k2 is subtracted from "0.5" and a DC voltage Vdc is added to the minimum phase voltage Vmin calculated at Step S502, so that a third voltage offset Voffset3 is calculated.

At Step S611, the third voltage offset Voffset3 calculated at Step S610 is individually subtracted from the three-phase basic voltage references Vub, Vvb and Vwb, so that three-phase modification voltage references Vu, Vv and Vw are calculated, respectively.

When determination is performed so that the modulation factor M is larger than the modulation-factor threshold value Mth at Step S604, the processing proceeds to Step S612.

At Step S612, a multiplication value between a value in which "0.5" is subtracted from a third constant k3 and a DC voltage Vdc is subtracted from the maximum phase voltage Vmax, so that a fourth voltage offset Voffset4 is calculated.

At Step S613, the fourth voltage offset Voffset4 calculated at Step S612 is individually subtracted from the three-phase basic voltage references Vub, Vvb and Vwb, so that three-phase modification voltage references Vu, Vv and Vw are calculated, respectively.

The fourth voltage offset Voffset4 is given by Expression (8).

[Expression Figure-8]

$$V_{offset4} = V_{max} - (k_3 - 0.5)V_{dc} \tag{8}$$

Figure 14:
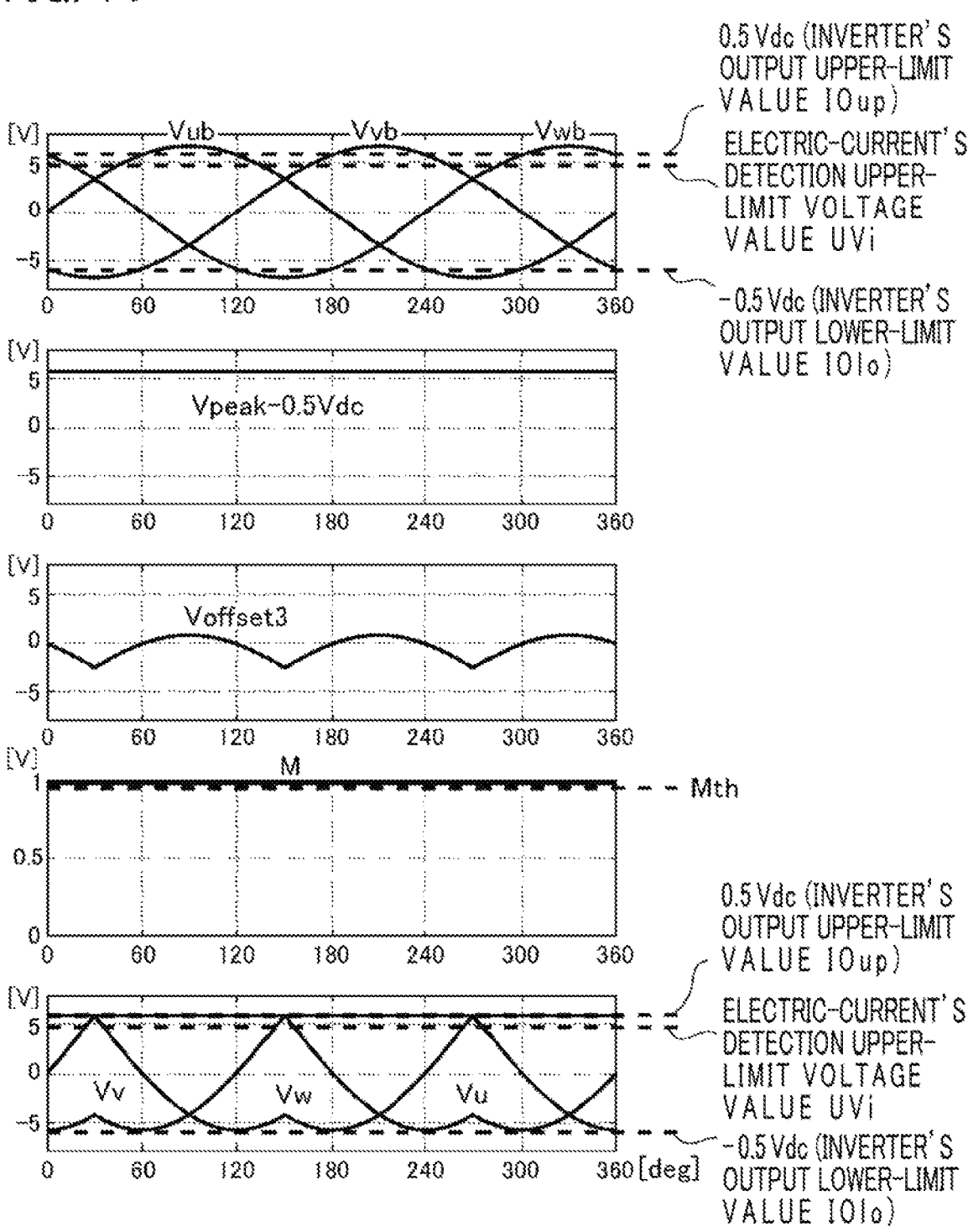
FIG. 14 is a diagram showing output waveforms of the power conversion device according to Embodiment 6.

Here, parameter k3 is a numerical value which determines a value of a maximum phase of three-phase modification voltage references Vu, Vv and Vw, and, when the maximum phase is made constant at an inverter's output upper-limit value, it is defined that "k3=1." In FIG. 14, an example is shown in which a modulation-factor threshold value Mth is defined at "0.95." In FIG. 14, when a modulation factor is larger than a modulation-factor threshold value, the maximum phase is made constant at the inverter's output upper-limit. In addition, although it is not newly shown in another figure, the outcome is the same as Embodiment 6 when the modulation factor is at the modulation-factor threshold value or less.

Embodiment 7

Figure 15:
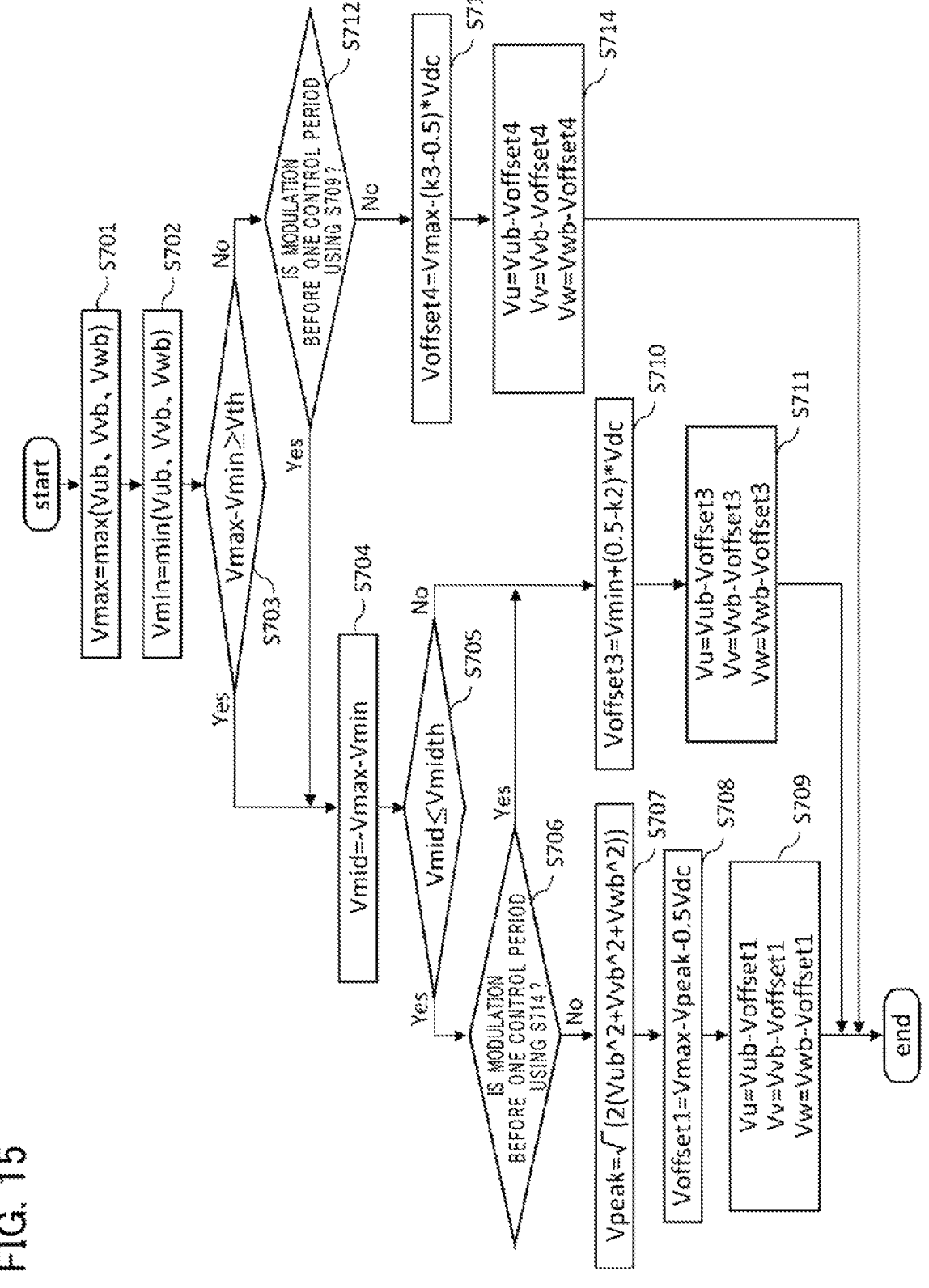
FIG. 15 is a flowchart showing calculation processing of a modulation control unit in an electrical power conversion device according to Embodiment 7.

Hereinafter, the explanation will be made for Embodiment 7; however, the explanation will be omitted for constituent items or portions redundant to those of Embodiment 1. FIG. 15 is a flowchart showing calculation processing of the modulation control unit 6 in Embodiment 7.

At Step S701, a maximum phase voltage Vmax is calculated when three-phase basic voltage references among the three-phase basic voltage references Vub, Vvb and Vwb are defined as a maximum phase, an intermediate phase and a minimum phase in decreasing order of value. At Step S702, a minimum phase voltage Vmin is calculated. At Step S703, determination is performed whether or not the difference between the maximum phase voltage Vmax and the minimum phase voltage Vmin is at a voltage threshold value Vth or more.

When determination is performed so that the difference between the maximum phase voltage Vmax and the minimum phase voltage Vmin is at the voltage threshold value Vth or more at Step S703, the processing proceeds to Step S704. At Step S704, an intermediate phase voltage Vmid is calculated from the maximum phase voltage Vmax and the minimum phase voltage Vmin.

At Step S705, determination is performed whether or not the intermediate phase voltage Vmid is at an intermediate phase voltage threshold value Vmidth or less. Here, the intermediate phase voltage threshold value Vmidth is set at "0."

When determination is performed so that the intermediate phase voltage Vmid is at the intermediate phase voltage threshold value Vmidth or less at Step S705, the processing proceeds to Step S706.

At Step S706, determination is performed whether or not modulation before one control period is based on modulation by using a third voltage offset Voffset3 as will be described later.

When determination is performed so that modulation before one control period is not based on modulation by using a third voltage offset Voffset3 at Step S706, the processing proceeds to Step S707.

At Step S707, the positive square root of a value in which sum of squares of the three-phase basic voltage references Vub, Vvb and Vwb is multiplied by "2" is calculated, so that a peak voltage Vpeak is calculated. Note that, as for a calculation method of a peak voltage as already explained in Embodiment 1, it is also possible to calculate the peak voltage by using α-phase and β-phase basic voltage references Vα and Vβ in which three-phase basic voltage references Vub, Vvb and Vwb are transformed into an α-axis and β-axis coordinate system by means of a known method of transformation of coordinate system, or by using d-phase and q-phase basic voltage references Vd and Vq in which the three-phase basic voltage references Vub, Vvb and Vwb are similarly transformed into a d-axis and q-axis coordinate system by means of a known method of transformation of coordinate system.

At Step S708, the peak voltage Vpeak is subtracted from the maximum phase voltage Vmax, and, from the value, a value in which a DC voltage Vdc is multiplied by "0.5" is calculated is subtracted, so that a first voltage offset Voffset1 is calculated.

At Step S709, the first voltage offset Voffset1 calculated at Step S708 is individually subtracted from the three-phase basic voltage references Vub, Vvb and Vwb, so that three-phase modification voltage references Vu, Vv and Vw are calculated, respectively.

When determination is performed so that the intermediate phase voltage Vmid is larger than the intermediate phase voltage threshold value Vmidth at Step S705, or when determination is performed so that modulation before one control period is based on modulation by using a third voltage offset Voffset3 at Step S706, the processing proceeds to Step S710. At Step S710, a multiplication value between a value in which a second constant k2 is subtracted from "0.5" and a DC voltage Vdc is added to the minimum phase voltage Vmin calculated at Step S502, so that a third voltage offset Voffset3 is calculated.

At Step S711, the third voltage offset Voffset3 calculated at Step S710 is subtracted from the three-phase basic voltage references Vub, Vvb and Vwb, so that three-phase modification voltage references Vu, Vv and Vw are calculated, respectively.

When determination is performed so that the difference between the maximum phase voltage Vmax and the minimum phase voltage Vmin is smaller than the voltage threshold value Vth at Step S703, the processing proceeds to Step S712.

At Step S712, determination is performed whether or not modulation before one control period is based on modulation by using a first voltage offset Voffset1.

When determination is performed so that the modulation before one control period is based on the modulation by using the first voltage offset Voffset1 at Step S712, the processing proceeds to Step S704.

When determination is performed so that the modulation before one control period is not based on the modulation by using a first voltage offset Voffset1 at Step S712, the processing proceeds to Step S713.

At Step S713, a multiplication value between a value in which "0.5" is subtracted from a third constant k3 and a DC voltage Vdc is subtracted from the maximum phase voltage Vmax, so that a fourth voltage offset Voffset4 is calculated.

At Step S714, the fourth voltage offset Voffset4 calculated at Step S713 is subtracted from the three-phase basic voltage references Vub, Vvb and Vwb, so that three-phase modification voltage references Vu, Vv and Vw are calculated, respectively.

The third voltage offset Voffset3 is given by Expression (7). Parameter k2 is a numerical value which determines a value of a minimum phase of three-phase modification voltage references Vu, Vv and Vw. When the minimum phase is made constant at an inverter's output lower-limit value, it is defined that "k2=0." In a case in which the two-phase modulation is avoided, the parameter k2 is defined at a minimum pulse duty of PWM; for example, when a carrier period is at 50 μs, and when a minimum pulse width of an inverter is at 0.5 μs, parameter k4 is set so that "0.5/50=0.01."

The fourth voltage offset Voffset4 is given by Expression (8). Parameter k3 is a numerical value which determines a value of the maximum phase on three-phase modification voltage references Vu, Vv and Vw, and herein, is set at a modulation factor of an electric-current's detection upper-limit voltage value. In FIG. 16, an example of output waveforms of the embodiment is shown.

The embodiment is a scheme in which modulation methods are changed over in accordance with the difference between a maximum phase and a minimum phase.

A voltage threshold value Vth for determining the difference between the maximum phase and the minimum phase is defined as a voltage value at an electric-current detection upper-limit. According to this scheme, it is so configured that a modulation method before one control period is referred to at Step S706 and Step S712 of FIG. 15, and, in accordance with the modulation method, a next modulation method is determined.

The explanation will be made for the reasons why such a configuration is taken.

In one period of electrical angle, the difference between a maximum phase and a minimum phase does not become constant but varies even when a modulation factor of three-phase basic voltage references is kept constant. For this reason, the modulation methods result in being changed over at the appropriate times even when the modulation factor of the three-phase basic voltage references is kept constant.

Figure 17:
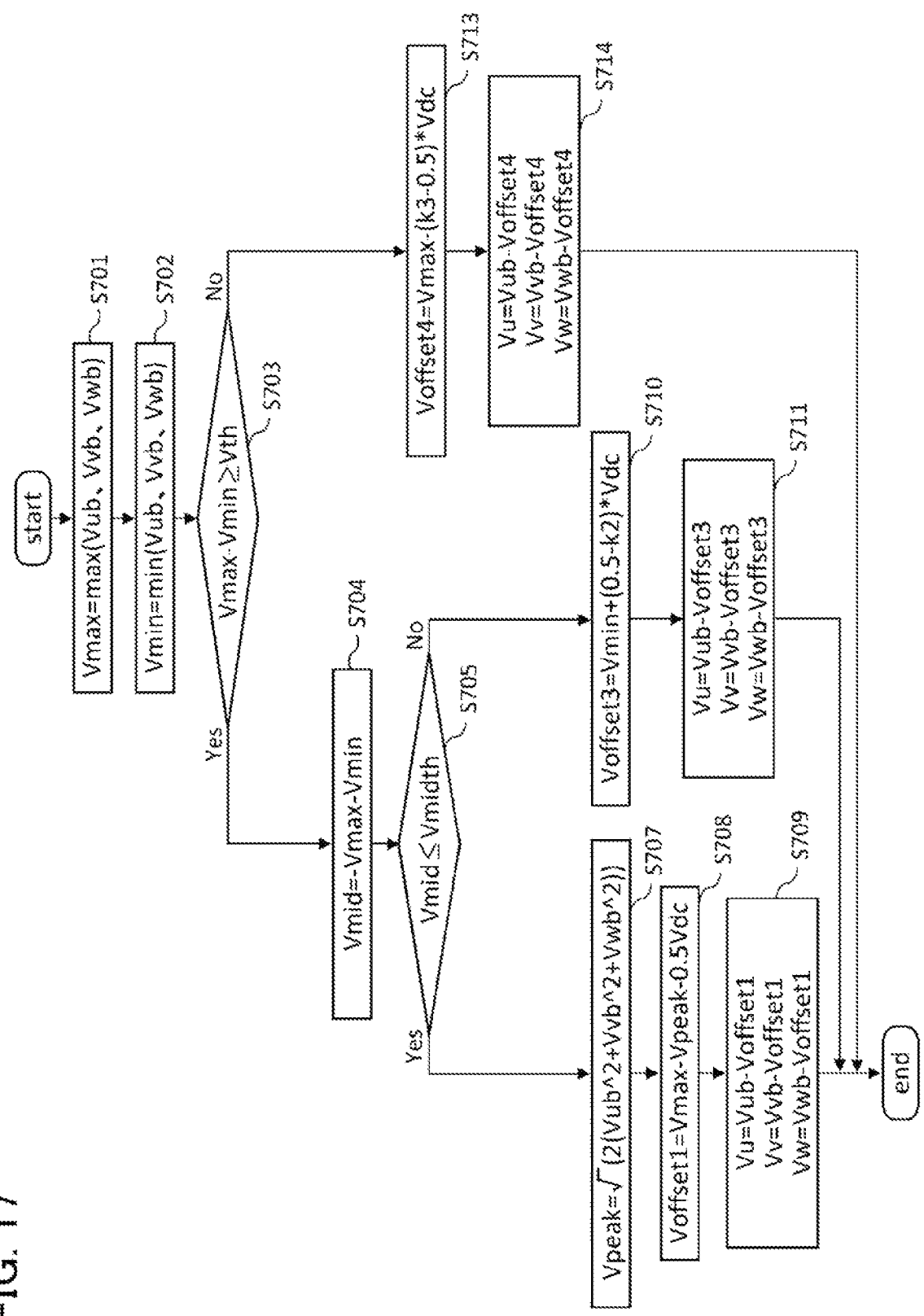
FIG. 17 is a flowchart showing another calculation processing of the modulation control unit in the power conversion device according to Embodiment 7.

The modulation at Step S709 and that at Step S714 are both modulation methods in which the maximum phase is kept at a constant value; and so, the maximum phase is kept constant at "Vpeak−0.5 Vdc" at Step S709, whereas the maximum phase is constant at a value determined in advance at Step S714. Here, a flowchart is shown in FIG. 17 in a case in which there exists no Step S706, nor Step S712. In the case of FIG. 17, the difference between a maximum phase and a minimum phase is not constant even when a modulation factor of three-phase basic voltage references is constant, and thus, there possibly exists an instant after the modulation is performed at Step S709, and subsequently, the modulation is performed in the following determination of a control period at Step S714. The converse is no doubt similar to that: there possibly exists an instant after the modulation is performed at Step S714, and subsequently, the modulation is performed in the following determination at Step S709.

Figures 18, 19:
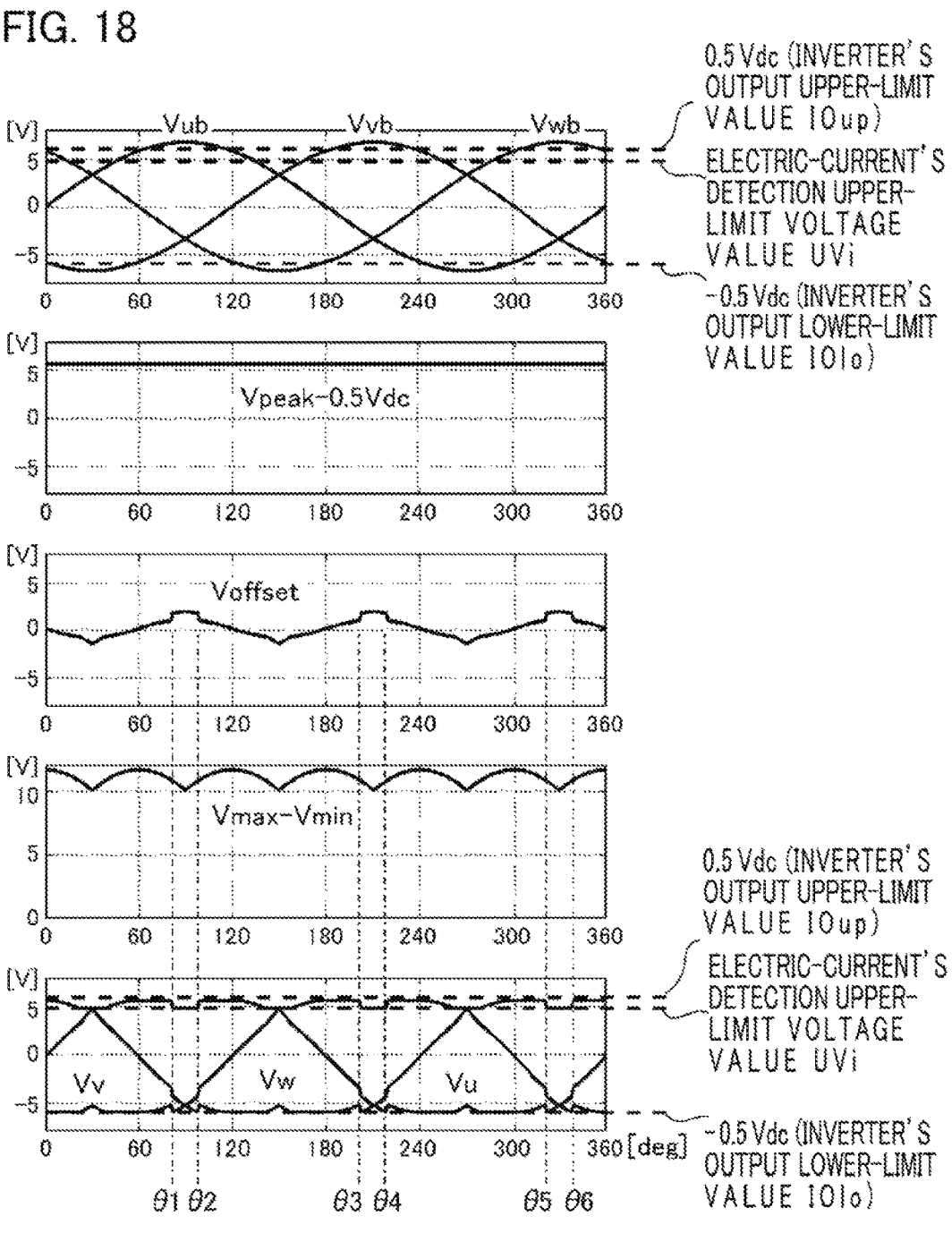
FIG. 18 is a diagram showing other output waveforms of the power conversion device according to Embodiment 7.
FIG. 19 is a diagram showing, by way of example, a hardware configuration of the modulation control unit in the power conversion device according to each of the embodiments.

Output waveforms are shown in this case in FIG. 18. At the timings of θ1, θ3 and θ5 of FIG. 18, the changeovers occur from Step S709 to Step S714, and, at the timings of θ2, θ4 and θ6 thereof, the changeovers occur from Step S714 to Step S709. For this reason, the maximum phase jumps at those instants, so that the maximum phase peaks appear at six times during one period of electrical angle. When the maximum phase peaks appear at six times, an electric current pulsates in a frequency of sixth-order in electrical angle, which leads to vibration and audible noise. For this reason, by introducing the condition of Step S706 of FIG. 15 and that of Step S712 thereof in the embodiment, it is configured in such a manner that a changeover from Step S709 to Step S714, or that from Step S714 to Step S709 does not occur.

According to the introduction of Step S706 and Step S712, it is so arranged that a changeover from Step S709 to Step S711 takes place, and subsequently, a changeover from Step S711 to Step S714 takes place. In addition, the converse is also similar to that described above. At the changeover from Step S709 to Step S711 and the changeover from Step S714 to Step S711, jumps of the maximum phase do not occur, so that the voltage offset becomes continuous. According to the embodiment, it is avoided to observe that peaks on a maximum phase of three-phase modification voltage references appear at six times in one period of electrical angle, so that it is possible to prevent the vibration of six-times frequency in one period of electrical angle of an electric current due to the occurrence in which the degradation timing of electric current detecting accuracy is caused at six times in the one period of electrical angle.

It should be noted that, as an example of hardware is shown in FIG. 19, the modulation control unit 6 is constituted of a processor 601 and a storage device 602. The storage device 602 is provided with a volatile storage device of a random access memory (RAM) or the like, and with a nonvolatile auxiliary storage device of a flash memory or the like, for example. In addition, in place of the flash memory, an auxiliary storage device of a hard disk may be provided with. The processor 601 executes a program(s) inputted from the storage device 602. In this case, the program(s) is inputted into the processor 601 from the auxiliary storage device by way of the volatile storage device. Moreover, the processor 601 may output its data of a calculated result(s) or the like into the volatile storage device of the storage device 602, or may store the data into the auxiliary storage device by way of the volatile storage device.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND
SYMBOLS

Numeral "3" designates an inverter; "5," basic voltage reference unit; "6," modulation control unit; "Sup," "Svp," "Swp," "Sun," "Svn," "Swn," switch (switching element); and "Ru," "Rv," "Rw," electric-current detecting resistance element.

What is claimed is:

1. A power conversion device for converting power from a direct-current (DC) power source to an alternating current (AC) rotating machine, the power conversion device comprising:

a basic voltage reference device for outputting basic voltage references corresponding to three-phase windings of the AC rotating machine;

a modulation control device for calculating a voltage offset on a basis of the basic voltage references, and for calculating modification voltage references by performing superposition of the voltage offset on the basic voltage references; and an inverter which converts, on a basis of the modification voltage references calculated by the modulation control device, a direct-current (DC) voltage into three-phase voltages whose voltages are applied to the three-phase windings of the AC rotating machine, and which includes an electric current detector for detecting an electric current flowing through each phase of the three-phase windings in accordance with voltage reduction by an electric-current detecting resistance element, wherein, the modulation control device is configured to:

identify a maximum phase voltage among the basic voltage references corresponding to the three-phase windings of the AC rotating machine, wherein the basic voltage references correspond to a maximum phase, an intermediate phase, and a minimum phase, respectively;

calculate a peak voltage based on a sum of squares of the basic voltage references;

calculate a first voltage offset by subtracting, from the maximum phase voltage, the peak voltage and a weighted value of the DC voltage of the DC power source; and calculate the modification voltage references by subtracting the first voltage offset from the basic voltage references, respectively.

* * * * *